United States Patent
Krichtafovitch et al.

(10) Patent No.: US 7,410,532 B2
(45) Date of Patent: Aug. 12, 2008

(54) METHOD OF CONTROLLING A FLUID FLOW

(76) Inventors: Igor A. Krichtafovitch, 6827 117 Ave. NE., Kirkland, WA (US) 98033; Jacob L. Oharah, 7833 NE. 155th Pl., Kenmore, WA (US) 98028; Volodymyr A. Bibikov, 9210 Redmond-Woodinville Rd., Apt. A-108, Redmond, WA (US) 98052; Christopher A. Martin, 807 215th Pl. SW., Lynnwood, WA (US) 98036; Vladimir L. Gorobets, 7609 147th Ave., NE., Redmond, WA (US) 98052; Maciej R. Ziomkowski, 807 215th Pl. SW., Lynnwood, WA (US) 98036; Terence Tak-Shing Tam, 10311 155th Pl. NE., Redmond, WA (US) 98052

( * ) Notice: Subject to any disclaimer, the term of this patent is extended or adjusted under 35 U.S.C. 154(b) by 93 days.

(21) Appl. No.: 11/347,565

(22) Filed: Feb. 6, 2006

(65) Prior Publication Data
US 2006/0226787 A1     Oct. 12, 2006

Related U.S. Application Data

(60) Provisional application No. 60/649,560, filed on Feb. 4, 2005.

(51) Int. Cl.
*B03C 3/00*     (2006.01)

(52) U.S. Cl. ............... 96/77; 96/79; 315/111.91; 250/423 R; 361/230

(58) Field of Classification Search ............ 315/111.91, 315/111.21, 111.61, 111.31; 250/423 R; 96/18, 75–79, 80, 95; 95/3, 57; 361/230, 361/232, 231
See application file for complete search history.

(56) References Cited

U.S. PATENT DOCUMENTS

| 1,345,790 A | 7/1920 | Lodge |
| 1,888,606 A | 11/1932 | Nesbit |
| 1,934,923 A | 11/1933 | Heinrich |

(Continued)

FOREIGN PATENT DOCUMENTS

DE     1158043     11/1963

(Continued)

OTHER PUBLICATIONS

Humpries, Stanley, "Principles of Charged Particle Accleration", Department of Electrical and Engineering, University of New Mexico, 1999 Download from: <http://www.fieldp.com/cpa/cpa.html> See, e.g. chapter 9 (attached).

(Continued)

*Primary Examiner*—Douglas W. Owens
*Assistant Examiner*—Ephrem Alemu

(57) ABSTRACT

An electrostatic fluid accelerator includes an electrode array including an array of corona discharge electrodes and an array of accelerating electrodes. A detector is configured to sense a constituent component of the fluid as present in an output from the electrode array. A control circuit supplies power to the electrode array, the control circuit being responsive to an output from the detector for operating the electrode array responsive a level of the constituent component.

16 Claims, 17 Drawing Sheets

U.S. PATENT DOCUMENTS

| | | |
|---|---|---|
| 1,950,816 A | 3/1934 | Richardson |
| 1,959,374 A | 5/1934 | Lissman |
| 2,587,173 A | 2/1952 | Landgraf |
| 2,590,447 A | 3/1952 | Nord, Jr. et al. |
| 2,695,129 A | 11/1954 | Stahmer |
| 2,765,975 A | 10/1956 | Lindenblad |
| 2,815,824 A | 12/1957 | Armsrong et al. |
| 2,826,262 A | 3/1958 | Byerly |
| 2,949,550 A | 8/1960 | Brown |
| 2,950,387 A | 8/1960 | Brubaker |
| 2,996,144 A | 8/1961 | Phyl |
| 3,026,964 A | 3/1962 | Penney |
| 3,071,705 A | 1/1963 | Coleman et al. |
| 3,108,394 A | 10/1963 | Ellman et al. |
| 3,144,129 A | 8/1964 | Weisberg |
| 3,198,726 A | 8/1965 | Trikilis |
| 3,223,233 A | 12/1965 | Becker et al. |
| 3,263,848 A | 8/1966 | Zackheim |
| 3,267,860 A | 8/1966 | Brown |
| 3,272,423 A | 9/1966 | Bjarno |
| 3,339,721 A | 9/1967 | Goldstein |
| 3,374,941 A | 3/1968 | Okress |
| 3,443,358 A | 5/1969 | Drenning et al. |
| 3,452,225 A | 6/1969 | Gourdine |
| 3,518,462 A | 6/1970 | Brown |
| 3,521,807 A | 7/1970 | Weisberg |
| 3,582,694 A | 6/1971 | Gourdine |
| 3,638,058 A | 1/1972 | Fritzius |
| 3,640,381 A | 2/1972 | Kanada et al. |
| 3,659,777 A | 5/1972 | Kanada et al. |
| 3,660,968 A | 5/1972 | Dyla et al. |
| 3,675,096 A | 7/1972 | Kiess |
| 3,684,156 A | 8/1972 | Fettinger et al. |
| 3,699,387 A | 10/1972 | Edwards |
| 3,740,927 A | 6/1973 | Vincent |
| 3,751,715 A | 8/1973 | Edwards |
| 3,892,927 A | 7/1975 | Lindenberg |
| 3,896,347 A | 7/1975 | Gelfand |
| 3,907,520 A | 9/1975 | Huang et al. |
| 3,918,939 A | 11/1975 | Hardt et al. |
| 3,936,635 A | 2/1976 | Clark et al. |
| 3,981,695 A | 9/1976 | Fuchs et al. |
| 3,983,393 A | 9/1976 | Thettu et al. |
| 3,984,215 A | 10/1976 | Zucker |
| 3,990,463 A | 11/1976 | Norman |
| 4,008,057 A | 2/1977 | Gelfand et al. |
| 4,011,719 A | 3/1977 | Banks |
| 4,061,961 A | 12/1977 | Baker |
| 4,086,152 A | 4/1978 | Rich et al. |
| 4,086,650 A | 4/1978 | Davis et al. |
| 4,124,003 A | 11/1978 | Abe et al. |
| 4,126,434 A | 11/1978 | Keiichi et al. |
| 4,136,162 A | 1/1979 | Fuchs et al. |
| 4,156,885 A | 5/1979 | Baker et al. |
| 4,162,144 A | 7/1979 | Cheney |
| 4,210,847 A | 7/1980 | Shannon et al. |
| 4,216,000 A | 8/1980 | Kofoid |
| 4,231,766 A | 11/1980 | Spurgin |
| 4,232,355 A | 11/1980 | Finger et al. |
| 4,240,809 A | 12/1980 | Elsbernd et al. |
| RE30,480 E | 1/1981 | Gelfand |
| 4,246,010 A | 1/1981 | Honacker |
| 4,259,707 A | 3/1981 | Penney |
| 4,266,948 A | 5/1981 | Teague et al. |
| 4,267,502 A | 5/1981 | Reese et al. |
| 4,292,493 A | 9/1981 | Selander et al. |
| 4,313,741 A | 2/1982 | Masuda et al. |
| 4,315,837 A | 2/1982 | Rourke et al. |
| 4,335,414 A | 6/1982 | Weber |
| 4,351,648 A | 9/1982 | Penney |
| 4,369,776 A | 1/1983 | Roberts |
| 4,376,637 A | 3/1983 | Yang |
| 4,379,129 A | 4/1983 | Abe et al. |
| 4,380,720 A | 4/1983 | Fleck et al. |
| 4,388,274 A | 6/1983 | Rourke et al. |
| 4,390,831 A | 6/1983 | Byrd et al. |
| 4,401,385 A | 8/1983 | Katayama et al. |
| 4,428,500 A | 1/1984 | Kohler |
| 4,448,789 A | 5/1984 | Yang |
| 4,477,268 A | 10/1984 | Kalt |
| 4,481,017 A | 11/1984 | Furlong |
| 4,496,375 A | 1/1985 | Le Vantine |
| 4,567,541 A | 1/1986 | Terai et al. |
| 4,569,852 A | 2/1986 | Yang |
| 4,576,826 A | 3/1986 | Liu et al. |
| 4,600,411 A | 7/1986 | Santamaria |
| 4,604,112 A | 8/1986 | Ciliberti et al. |
| 4,632,135 A | 12/1986 | Lenting et al. |
| 4,643,745 A | 2/1987 | Sakakibara et al. |
| 4,646,196 A | 2/1987 | Reale |
| 4,649,703 A | 3/1987 | Dettling et al. |
| 4,673,416 A | 6/1987 | Sakakibara et al. |
| 4,689,056 A | 8/1987 | Noguchi et al. |
| 4,713,243 A | 12/1987 | Schiraldi et al. |
| 4,713,724 A | 12/1987 | Voelkel et al. |
| 4,719,535 A | 1/1988 | Zhenjun et al. |
| 4,740,826 A | 4/1988 | Chatterjee |
| 4,740,862 A | 4/1988 | Halleck |
| 4,741,746 A | 5/1988 | Chao et al. |
| 4,772,998 A | 9/1988 | Guenther, Jr. et al. |
| RE32,767 E | 10/1988 | Jonelis |
| 4,775,915 A | 10/1988 | Walgrove, III |
| 4,783,595 A | 11/1988 | Seidl |
| 4,789,801 A | 12/1988 | Lee |
| 4,790,861 A | 12/1988 | Watai et al. |
| 4,808,200 A | 2/1989 | Dallhammer et al. |
| 4,811,159 A | 3/1989 | Foster, Jr. |
| 4,812,711 A | 3/1989 | Torok et al. |
| 4,815,784 A | 3/1989 | Zheng |
| 4,837,658 A | 6/1989 | Reale |
| 4,838,021 A | 6/1989 | Beattie |
| 4,841,425 A | 6/1989 | Maeba et al. |
| 4,849,246 A | 7/1989 | Schmidt |
| 4,853,719 A | 8/1989 | Reale |
| 4,853,735 A | 8/1989 | Kodama et al. |
| RE33,093 E | 10/1989 | Schiraldi et al. |
| 4,878,149 A | 10/1989 | Stiehl et al. |
| 4,924,937 A | 5/1990 | Beal et al. |
| 4,925,670 A | 5/1990 | Schmidt |
| 4,936,876 A | 6/1990 | Reyes |
| 4,938,786 A | 7/1990 | Tonomoto et al. |
| 4,941,068 A | 7/1990 | Hofmann |
| 4,941,353 A | 7/1990 | Fukatsu et al. |
| 4,980,611 A | 12/1990 | Orenstein |
| 4,996,473 A | 2/1991 | Markson et al. |
| 5,004,595 A | 4/1991 | Cherukuri et al. |
| 5,006,761 A * | 4/1991 | Torok et al. ............ 315/111.91 |
| 5,012,159 A | 4/1991 | Torok et al. |
| 5,021,249 A | 6/1991 | Bunick et al. |
| 5,024,685 A | 6/1991 | Torok et al. |
| 5,055,118 A | 10/1991 | Nagoshi et al. |
| 5,059,219 A | 10/1991 | Plaks et al. |
| 5,072,746 A | 12/1991 | Kantor |
| 5,076,820 A | 12/1991 | Gurvitz |
| 5,077,500 A | 12/1991 | Torok et al. |
| 5,087,943 A | 2/1992 | Creveling |
| 5,136,461 A | 8/1992 | Zellweger et al. |
| 5,138,513 A | 8/1992 | Weinstein |
| 5,155,531 A | 10/1992 | Kurotori et al. |
| 5,163,983 A | 11/1992 | Lee et al. |
| 5,165,799 A | 11/1992 | Wood |
| 5,199,257 A | 4/1993 | Colletta et al. |
| 5,215,558 A | 6/1993 | Moon |
| 5,245,692 A | 9/1993 | Kawai et al. |

| | | | | | | |
|---|---|---|---|---|---|---|
| 5,257,073 | A | 10/1993 | Gross et al. | 6,210,642 B1 | 4/2001 | Lee et al. |
| 5,269,131 | A | 12/1993 | Brophy | 6,215,248 B1 | 4/2001 | Noll |
| 5,284,659 | A | 2/1994 | Cherukuri et al. | 6,221,402 B1 | 4/2001 | Itoh et al. |
| 5,330,559 | A | 7/1994 | Cheney et al. | 6,224,653 B1 | 5/2001 | Shvedchikov et al. |
| 5,354,551 | A | 10/1994 | Schmidt | 6,228,330 B1 | 5/2001 | Herrmann et al. |
| 5,368,839 | A | 11/1994 | Aime et al. | 6,231,957 B1 | 5/2001 | Zerbe et al. |
| 5,369,953 | A | 12/1994 | Brophy | 6,238,690 B1 | 5/2001 | Kiefer et al. |
| 5,423,902 | A | 6/1995 | Strutz et al. | 6,245,126 B1 | 6/2001 | Feldman et al. |
| 5,469,242 | A | 11/1995 | Yu et al. | 6,245,132 B1 | 6/2001 | Feldman et al. |
| 5,474,599 | A | 12/1995 | Cheney et al. | 6,312,507 B1 | 11/2001 | Taylor et al. |
| 5,484,472 | A | 1/1996 | Weinberg | 6,313,064 B1 | 11/2001 | Miyafuji et al. |
| 5,508,880 | A | 4/1996 | Beyer | 6,350,417 B1 | 2/2002 | Lau et al. |
| 5,518,730 | A | 5/1996 | Fuisz | 6,365,215 B1 | 4/2002 | Grainger et al. |
| 5,535,089 | A | 7/1996 | Ford et al. | 6,375,714 B1 * | 4/2002 | Rump et al. ..................... 95/3 |
| 5,542,967 | A | 8/1996 | Ponizovsky et al. | 6,375,963 B1 | 4/2002 | Repka et al. |
| 5,556,448 | A | 9/1996 | Cheney et al. | 6,394,086 B1 | 5/2002 | Barnes et al. |
| 5,569,368 | A | 10/1996 | Larsky et al. | 6,404,089 B1 | 6/2002 | Tomion |
| 5,578,112 | A | 11/1996 | Krause et al. | 6,419,903 B1 | 7/2002 | Xu et al. |
| 5,601,636 | A | 2/1997 | Glucksman | 6,444,240 B1 | 9/2002 | Barkalow et al. |
| 5,603,971 | A | 2/1997 | Porzio et al. | 6,497,899 B2 | 12/2002 | Thombre et al. |
| 5,642,254 | A | 6/1997 | Benwood et al. | 6,504,308 B1 * | 1/2003 | Krichtafovitch |
| 5,656,063 | A | 8/1997 | Hsu et al. | | | et al. ..................... 315/111.91 |
| 5,661,299 | A | 8/1997 | Purser | 6,517,865 B2 | 2/2003 | Cade et al. |
| 5,665,147 | A | 9/1997 | Taylor et al. | 6,534,042 B2 | 3/2003 | Delli Santi et al. |
| 5,667,564 | A | 9/1997 | Weinberg | 6,574,123 B2 | 6/2003 | Wiser, III et al. |
| 5,700,478 | A | 12/1997 | Biegajski et al. | 6,603,268 B2 | 8/2003 | Lee |
| 5,707,422 | A | 1/1998 | Jacobsson et al. | 6,664,741 B1 | 12/2003 | Krichtafovitch |
| 5,707,428 | A | 1/1998 | Feldman et al. | 6,888,314 B2 | 5/2005 | Krichtafovitch et al. |
| 5,726,161 | A | 3/1998 | Whistler | 6,919,698 B2 | 7/2005 | Krichtafovitch |
| 5,769,155 | A | 6/1998 | Ohadi et al. | 6,937,455 B2 | 8/2005 | Krichtafovitch et al. |
| 5,779,769 | A | 7/1998 | Jiang et al. | 7,150,780 B2 | 12/2006 | Krichtafovitch et al. |
| 5,814,135 | A | 9/1998 | Weinberg | 2001/0004046 A1 | 6/2001 | Taylor et al. |
| 5,827,407 | A | 10/1998 | Wang et al. | 2001/0022964 A1 | 9/2001 | Leung et al. |
| 5,847,917 | A | 12/1998 | Suzuki et al. | 2001/0032544 A1 | 10/2001 | Taylor et al. |
| 5,854,742 | A | 12/1998 | Faulk | 2001/0048906 A1 | 12/2001 | Lau et al. |
| 5,892,363 | A | 4/1999 | Roman et al. | 2002/0079212 A1 | 6/2002 | Taylor et al. |
| 5,894,001 | A | 4/1999 | Hitzler | 2002/0098131 A1 | 7/2002 | Taylor et al. |
| 5,897,897 | A | 4/1999 | Porzio et al. | 2002/0122751 A1 | 9/2002 | Sinaiko et al. |
| 5,899,666 | A | 5/1999 | Chung et al. | 2002/0122752 A1 | 9/2002 | Taylor et al. |
| D411,011 | S | 6/1999 | Pinchuk | 2002/0127156 A1 | 9/2002 | Taylor |
| 5,920,474 | A | 7/1999 | Johnson et al. | 2002/0127190 A1 | 9/2002 | Zerbe et al. |
| 5,939,091 | A | 8/1999 | Eoga et al. | 2002/0131990 A1 | 9/2002 | Barkalow et al. |
| 5,942,026 | A | 8/1999 | Erlichman et al. | 2002/0141914 A1 | 10/2002 | Lau et al. |
| 5,948,430 | A | 9/1999 | Zerbe et al. | 2002/0150544 A1 | 10/2002 | Zerbe et al. |
| 5,951,957 | A | 9/1999 | Simpson | 2002/0155041 A1 | 10/2002 | McKinney et al. |
| 5,973,905 | A | 10/1999 | Shaw et al. | 2003/0008008 A1 | 1/2003 | Leung et al. |
| 5,982,102 | A | 11/1999 | Andrzej et al. | 2003/0033176 A1 | 2/2003 | Hancock |
| 5,993,521 | A | 11/1999 | Loreth et al. | 2003/0035841 A1 | 2/2003 | Dzija et al. |
| 6,007,682 | A | 12/1999 | Hancock et al. | 2003/0053962 A1 | 3/2003 | Zerbe et al. |
| D420,438 | S | 2/2000 | Pinchuk | 2003/0147785 A1 | 8/2003 | Joannou |
| 6,023,155 | A | 2/2000 | Kalinsky et al. | 2003/0165410 A1 | 9/2003 | Taylor |
| 6,042,637 | A | 3/2000 | Weinberg | 2003/0170150 A1 | 9/2003 | Lau et al. |
| 6,056,808 | A | 5/2000 | Krause et al. | 2003/0206837 A1 | 11/2003 | Taylor et al. |
| D427,300 | S | 6/2000 | Pinchuk | 2003/0206839 A1 | 11/2003 | Taylor et al. |
| 6,084,350 | A | 7/2000 | Ezaki et al. | 2003/0206840 A1 | 11/2003 | Taylor et al. |
| 6,108,504 | A | 8/2000 | Dickhoff | 2003/0209420 A1 | 11/2003 | Taylor et al. |
| 6,125,636 | A | 10/2000 | Taylor et al. | 2003/0234618 A1 | 12/2003 | Krichtafovitch |
| D433,494 | S | 11/2000 | Pinchuk et al. | 2004/0004440 A1 | 1/2004 | Krichtafovitch et al. |
| D434,483 | S | 11/2000 | Pinchuk | 2004/0004797 A1 | 1/2004 | Krichtafovitch et al. |
| 6,145,298 | A | 11/2000 | Burton, Jr. | 2004/0025497 A1 | 2/2004 | Truce |
| 6,152,146 | A | 11/2000 | Taylor et al. | 2004/0033340 A1 | 2/2004 | Lau et al. |
| 6,163,098 | A | 12/2000 | Taylor et al. | 2004/0047775 A1 | 3/2004 | Lau et al. |
| 6,167,196 | A | 12/2000 | Huggins, Jr. et al. | 2004/0052700 A1 | 3/2004 | Kotlyar et al. |
| 6,174,514 | B1 | 1/2001 | Cherukuri et al. | 2004/0057882 A1 | 3/2004 | Lau et al. |
| 6,176,977 | B1 * | 1/2001 | Taylor et al. ................. 204/176 | 2004/0079233 A1 | 4/2004 | Lau et al. |
| 6,177,096 | B1 | 1/2001 | Zerbe et al. | 2004/0212329 A1 | 10/2004 | Krichtafovitch et al. |
| 6,182,671 | B1 | 2/2001 | Taylor et al. | 2004/0217720 A1 | 11/2004 | Krichtafovitch |
| 6,187,351 | B1 | 2/2001 | Porzio et al. | 2005/0151490 A1 | 7/2005 | Krichtafovitch |
| D438,513 | S | 3/2001 | Pinchuk | | | |
| 6,195,827 | B1 | 3/2001 | Dumitriu et al. | | FOREIGN PATENT DOCUMENTS | |
| 6,200,539 | B1 | 3/2001 | Sherman et al. | | | |
| 6,203,600 | B1 | 3/2001 | Loreth et al. | GB | 926128 | 5/1963 |
| D440,290 | S | 4/2001 | Pinchuk | JP | 63-143954 | 6/1988 |

| | | |
|---|---|---|
| WO | WO-9425170 | 11/1994 |

OTHER PUBLICATIONS

Chen, Junhong, "Direct-Current Corona Enhanced Chemical Reactions" Thesis, University of Minnesota, USA. Aug. 2002 Download from: <http://www.menet.umn.edu/jhchen/Junhong_dissertation_final.pdf>.

Request for Ex Parte Reexamination under 37 C.F.R. 1.510: application No. 90/007,276, filed on Oct. 29, 2004. cited by other.

* cited by examiner

METHOD OF CONTROLLING A FLUID
FLOW

CROSS-REFERENCE TO RELATED
APPLICATIONS

The instant application claims the benefit of U.S. Provisional Application No. 60/649,560, filed Feb. 4, 2005, pursuant to 35 U.S.C. 0119(e) and is related to and incorporates herein by reference in their entirety applicant's previously filed U.S. Patent Applications as follows:

BACKGROUND OF THE INVENTION

1. Field of Invention

The invention relates to a device for accelerating, thereby imparting velocity and momentum to a fluid, and particularly to the use of corona discharge technology to generate ions and electrical fields for the movement and control of fluids including gases such as air, liquids, etc.

2. Description of the Related Art

A number of patents (see, e.g., U.S. Pat. No. 4,210,847 by Shannon, et al. and U.S. Pat. No. 4,231,766 by Spurgin) describe ion generation using an electrode (termed a "corona electrode"), for accelerating charged particles (i.e., "ions") toward another electrode (termed an "accelerating", "collecting" or "target" electrode), thereby imparting momentum to the ions in a direction toward the accelerating electrode. Collisions between the ions and an intervening fluid, such as surrounding air molecules, transfer the momentum of the ions to the fluid inducing a corresponding movement of the fluid to achieve an overall movement in a desired fluid flow direction (e.g., from corona electrode toward the accelerating electrode).

U.S. Pat. No. 4,789,801 of Lee, U.S. Pat. No. 5,667,564 of Weinberg, U.S. Pat. No. 6,176,977 of Taylor, et al., and U.S. Pat. No. 4,643,745 of Sakakibara, et al. also describe air movement devices that accelerate air using an electrostatic field. Air velocity achieved in these devices is very low and is not practical for commercial or industrial applications.

U.S. Pat. Nos. 4,812,711 and 5,077,500 of Torok et al. describe the use of Electrostatic Air Accelerators (EFA) having a combination of different electrodes placed at various locations with respect to each other and different voltage potentials.

Unfortunately, none of these devices is able to produce a commercially viable amount of the airflow. Varying relative location of the electrodes with respect to each other provides only a limited improvement in EFA performance and fluid velocity. For example, U.S. Pat. No. 4,812,711 of Torok et al. reports generating an air velocity of only 0.5 m/s, far below that expected of and available from commercial fans and blowers. One of the main reasons for such poor air velocity is due to the impermissibly high amount of ozone generated by EFAs when operated at high power levels.

Accordingly, a need exists for a practical electrostatic fluid accelerator capable of producing commercially useful flow rates and providing a safe environment for human habitat.

SUMMARY OF THE INVENTION

The invention addresses a significant deficiency in the prior art, the limited ability of prior limitations EFAs to produce a substantial fluid flow while maintaining a relatively low ozone output. Prior attempts to increase air velocity have lead to increased ozone generation resulting in unsafe ozone levels not suitable for human habitat.

This problem is most evident and of concern when an EFA operates near or at maximum capacity, i.e., with some maximum voltage applied and power consumed. Such problem arises when a more robust fluid flow is necessary or desirable (e.g., higher fluid flow rates). This is even more important when an EFA is located in a confined or an un-ventilated space, such as a room or office. In certain conditions, such as in an enclosed room with metal or vinyl walls, ozone does not dissipate as rapidly as it is produced and therefore tends to accumulate. In such conditions even a small amount of ozone generation may lead to large and unacceptable ozone concentrations after some relatively short period of operating time.

Therefore a need exists not only to minimize or eliminate zone generation but for the efficient control of ozone content in the air: Unfortunately, existing ozone monitors are large and relatively expensive.

Recently, relatively compact ozone sensor have become commercially available. For example, City Technology Corporation (UK, www.citytech.com) manufactures compact ozone sensors that operate over ranges of ozone concentration that makes them suitable for ozone control in and for human habitats. These compact sensors, however, require a substantial airflow through the sensor body an airflow on the order of greater than 2 liters per minute. A traditional way of providing such a rate of airflow is by the installation of an auxiliary mechanical fan that blows the ozonated air though the sensor. Such fans are expensive and generate an unpleasant background noise that negates one of the benefits of an electrostatic air cleaner-silent operation. Since most of the EFAs known in the art are not capable of generating a sufficient amount of airflow, such an auxiliary fan has been the only option known in the art. As mentioned, to provide the required amount of the air through a typical compact sensor requires a substantial airflow be provided through the body of the gas-sensitive portion of the sensor.

According to the disclosure of U.S. Pat. Nos. 6,727,657 and 6,504,308, an EFA consists of a number of the wire-like corona electrodes and collecting (or target) electrodes. It is has been experimentally determined that such an EFA has a non-uniform air profile, i.e. air velocity values vary significant at differing portions of the EFA. For example, airflow at the ends of the corona electrodes is substantially less that at the center; airflow immediately behind collecting electrode bars or fins is lower than in the area between the collecting electrode bars. It is also desirable that the EFA provide a controlled amount of air, i.e. the amount of air should vary according to consumer requirements or needs.

In consideration of these factors, an EFA including an ozone sensor may be realized if the following requirements are satisfied. One condition is that, the ozone sensor should be placed in an area with maximum airflow, i.e. between the collecting electrodes and preferably spaced some distance from the ends of the electrodes (e.g., at least ½" from the end). Second, if the EFA is located within an enclosure that has a protective grill, screen or grid, that structure should not restrict airflow through the sensor. This condition is best satisfied when the protective grid is configured in a shape that reflects or "mirrors" the collecting electrodes' shape, i.e., most commonly in the same shape as and aligned with the fins. Those fins should be parallel to the collecting electrodes and located as an extension of the planes of the collecting electrodes.

When supplied with a sufficient airflow though its body, the ozone sensor may sample ozonated air at the ETA outlet and provide an electrical signal to EFA control circuitry that controls the airflow so as to maintain an ozone concentration at or below some predetermined safe level. This level is specified for electrostatic air cleaners as no greater than 50 parts per billion (ppb). If this maximum level of 50 ppb is reached, then the control means may decrease air velocity so as to reduce ozone generation or even completely deactivate (e.g., "turn off") the EFA so as to allow accumulated ozone to dissipate and/or be converted (i.e., provide for its decomposition back) to oxygen.

Description of Ozone Sensor Coding

An aspect of the invention is directed toward determining an ambient level of ozone. In addition to the need to periodically calibrate the sensor, it is desirable to be able to extrapolate overall ambient ozone levels from a local sample taken at the EFA.

Periodic calibration is necessary because each ozone sensor reacts differently to ozone (e.g., there are variations between and among sensors) and each sensor ages over time causing a gradual shifting in sensitivity and necessitating periodic recalibration. Sensor calibration can be performed by the associated microprocessor to provide accurate ozone concentration measurements. This is accomplished by a calibration process that determines the reactivity of the ozone sensor. The process begins with turning on the sensor to detect an initial level of ambient ozone in the surrounding space (e.g., within a confined space such as a room) while the EFA unit is off (e.g. not generating ozone). This initial baseline measurement is used to determine the ozone sensor reading (e.g., output level) for an assumed concentration of 0 parts per billion (ppb). After some short period of time, (e.g., 10-20 min), the EFA is turned on so as to generate ozone at some known, substantially constant, rate or production. Thus, another short time period of time (e.g., 5-10 minutes) another reading from the ozone sensor provides another reference point based on the historically determined ozone concentration value (i.e., the sensor output provided at this known ozone level). Using this point and the previously determined zero ozone concentration point, a calibration curve or table is calculated so as to extrapolate a reading corresponding to a predetermined safe/harmful ozone level, e.g. a sensor reading corresponding to an ozone concentration level of 50 ppb. Preferably, the self-calibration is performed periodically such as every time the unit is plugged in, activated, or based on some other criteria.

Once the threshold level (e.g., for the present example, 50 ppb) has been determined, suitable adjustments can be made to unit operation so that this level is not reached so as to protect the user from potentially hazardous levels of ozone. For example, under control of the microprocessor, the unit can be set to decrease power (resulting in a corresponding reduction in ozone production) so as to maintain the ambient ozone level below 50 ppb. If necessary, unit operation may be interrupted (e.g., turned off) ozone concentration levels continue to rise to or exceed some predetermined dangerous levels.

A factor in obtaining accurate ozone concentration measurements is that most sensors require specified conditions to properly stabilize. This is due in part to current sensors requiring a relatively large air flow rate to properly stabilize. Without stabilization the unit continues to try to adjust for every spike and dip that sensor readings show, making the unit behave erratically, frequently switching from high power to low power settings.

To address the aforementioned "hunting" problem, the microprocessor controller maintains a data log containing histories past ozone readings and operating speeds of the unit that can then be used to determine the operating environment of the EFA unit.

According to various embodiments of the invention, at least two methods may be employed to identify aspects of the operational environment of the EFA relevant to calibrating, monitoring and regulating EFA operation to constrain ozone levels to a predetermined maximum ambient threshold concentration level such as the aforementioned 50 ppb.

According to one method, an initial sensor calibration is performed to identify sensor values corresponding to 0 ppb and some predetermined concentration level resulting from some short period of operation (i.e., wherein typical room size is such that the ambient ozone level is substantially lower than the level in an immediate vicinity of the sensor). After this initial calibration is completed, the unit's microprocessor periodically (e.g., every two minutes) logs the speed at which the unit is functioning (i.e., the operating level of the EFA).

For example, upon examination of the log the microprocessor may find that the unit has been functioning at very low speeds or that it has shut itself off because it has detected that the threshold ozone concentration level of 50 ppb has been reached. This operational history may result in the microprocessor characterizing the operating environment of the EFA unit as corresponding to that of a small and/or unventilated space or room. As a result, the processor may be programmed to completely inhibit EFA operation as being unsafe in light of the consistently high resultant ozone concentration levels produced. Alternative, if instead the microprocessor determines by review of the operating log that the unit has been functioning mainly at higher speeds, the microprocessor may determine that the environment in which the unit is functioning is adequate for operation. In this case the microprocessor may be programmed to determine some appropriate constant level of EFA operation so as to reduce or eliminate operational fluctuations. The use of some average operating level may even permit short periods of operation during a period of time in which the sensor indicates an ozone level above some threshold value such as the aforementioned 50 ppb. This may be accomplished by averaging readings over some period of time so as to implement an appropriate hysteresis representative of local ozone concentration levels versus overall levels throughout the operating space. That is, the microprocessor may permit operation of the EFA unit to produce a spike in ozone level above 50 ppb because, through experiment, testing, calculation or otherwise it has been determined that the actual ozone in the typical ventilated room does not reach 50 ppb.

Another method again first performs some initial calibration steps as previously explained. The microprocessor logs the ozone sensor readings and uses this log of data to determine the rate at which an ozone level is increasing in the room. The rate at which the ozone level increases for any particular operating level of the EFA can be attributed to size and ventilation characteristics of the room. That is, a small unventilated room will cause ozone levels to rise steeply, while in a large and/or ventilated room, ozone levels will rise slowly or not all. If the microprocessor calculates that the rate of increase of ozone is too great (i.e., exceeds some predetermined threshold value), the microprocessor may then determine that the EFA unit is in an environment that is inadequate for the unit to operate without resulting in exceeding some safe level of ozone concentration, and will shut the unit down. If the rise in ozone is slow, then microprocessor will allow readings of greater than 50 ppb for some period of time without reducing the speed or operating level of the EFA unit.

Various modifications and enhancement to the basic methods outlined above may be incorporated to further improve device operation including, for example, stored templates of ozone level concentrations characteristic of various predetermined operating environments; the use of ozone filtering/elimination devices to provide a known, zero ozone level sample to the sensor, the use of multiple sensors (e.g., at both air intake and outlet ports) to monitoring an ozone level increase due to EFA operation, etc.

A standard box model equation may be used and implemented by the microprocessor for calculating/predicting indoor concentrations. Complete mixing is assumed.

$$V(dC/dt)=E+C_aIV-CIV-KCV$$

where,
C=concentration (mg/m$^3$)
$C_a$=ambient (outdoor) concentration (mg/m$^3$)
E=emission rate (mg/h)
I=air changes per hour in room
V=room volume (m$^3$)
t=time (h)
K=decay rate (h$^{-1}$)

This equation has the following general solution:

$$C=[1/(I+K)][(E/V)+(C_a)(I)][1-\exp\{-(I+K)(t)\}]+C_o \exp\{-(I+K)(t)\}$$

where:
$C_0$=initial concentration in room (mg/m$^3$).

Based on prior operations, site specific constants and variables may be extracted from the log and used by the microprocessor to correlate overall ozone concentrations within the room as a function of EFC device operating levels/ozone production rates.

If a high airflow is desirable and a relatively high ozone level is produced at this airflow, another and/or additional means to reduce ozone may be implemented. In particular in the disclosures of applicant's prior patent application Ser. No. 10/727,707 filed Dec. 2, 2003 (the '707 application) and incorporated herein in its entirety by reference, different corona electrode materials are considered. It was found that materials that are easily oxidized in the corona discharge field produce several fold less ozone than neutral materials. In particular, silver was found as having a minimum ozone production. At the same time as reducing ozone, silver oxidizes relatively rapidly particularly when used as a corona discharge electrode. Since silver oxide is less conductive than un-oxidized silver and since, over the course of time oxide covers all of the exposed surface, the resultant increase of electrode electrical resistance eventually prevents corona discharge generation.

As was proposed in the prior '707 Application, silver or silver coated corona wire may be periodically heated by applying an appropriate voltage so as to induce an electric heating current to flow through the electrode. This heating of the electrode restores the corona electrode material back to its original state (i.e., back to non-oxidized silver} by converting silver-oxide to silver. It has been experimentally found that selecting an appropriate heating period as well as a suitable heating mode plays important roles in the corona electrode's longevity. For example, it has been found that heating power should be progressively increased over the life of the electrodes to maximize electrode restoration. For example, during some initial period that may last from 10 to 100 hours of device operation the heating power may remain at some initial power level. This power level may be defined as the power level that ensures proper corona electrode temperature; e.g., a temperature between silver oxide converting to silver (i.e. above 180° C.) and the melting temperature of silver (i.e. below 961° C.). Various heating profiles may be used over this range of temperatures and various heating periods to achieve both (i) a desired removal of oxides and/or other contaminants, (ii) desirable hardness and fatigue-resistance of the electrode.

It has been experimentally found that during the heating process the corona electrode is subjected to substantial mechanical stress and fatigue caused by thermal expansion and contraction of the metal during heating and cooling. In the case of silver plated electrodes, the thermal expansion coefficient of the silver and the underlying core material (e.g., stainless steel) are different. In fact the respective thermal coefficients of expansion may differ by several multiples of each other (i.e., one may be two or three times larger than the other). Two conditions should be satisfied to ensure maximum longevity of the corona electrodes. First the time rate of thermal expansion and contraction should be moderated, i.e., should not be rapid. Gradual application and removal or "ramping" of the heating power provides a slow rate of expansion and contraction. That alone reduces thermal and mechanical stress to which the electrode materials are subjected. Secondly, the core material should have a thermal expansion coefficient close to or lower than the outer layer material or coating (i.e. silver). By observing these limitations, failure of the coating materials during the expansion is minimized or eliminated. For example, a good match for silver is stainless steel and iro alloys such as inconel; while the thermal expansion coefficient of silver is about $18.9\times10^{-6}/°$ C., the thermal expansion coefficient of inconel is between 11 and $14.3\times10^{-6}/°$ C.

Another important factor to be considered in maxi longevity is the chemical deposit that is observed on the corona wires in different studies of the corona phenomenon. When some substances are present in the surrounding air the rate of chemical reaction between the substance and the electrode may be accelerated by the corona field which is saturated with active negative and positive ions. Some of the reactions yield solid deposits on the active portions of the corona electrodes. This solid deposit is harmful to the corona processes and, over some period of time (e.g., over the course of tens or hundreds hours), is capable of completely covering or encapsulating the corona electrode and destroying or disrupting conditions required to support generation of corona discharge. This problem is well known in the electrostatic precipitators (ESP) field. There, in order to prevent formation of a harmful deposit on the electrodes, including larger particles to be collected on the corona electrode, the corona electrode is periodically mechanically shaken with a force sufficient to dislodge the particles. This technique is not convenient or practical for home air cleaners because the mechanical force defeats or negates a main advantage of the EFA-noiseless operation.

It has been further experimentally determined that simultaneous application of high voltage and heat to a corona electrode leads to mechanical vibration of the electrode. This is because a corona electrode (and, in particular, an electrode in the form of a thin wire) is heated, it expands and sags. Being subjected to a different electrical potential along the length of such a wire, opposite electrodes attract one another. It has been sagging and attraction leads to a substantial vibration of the wire. The amplitude and frequency of the vibration may be controlled so as to be sufficient to "shake off" particles and even solid deposits that have settled or formed on the corona observed that the wire.

In order to prevent electrical breakdown or arcing when a portion of an operating electrode wire moves closer to an opposite electrode than when inactive and cold, the high voltage applied to generate the corona discharge should be reduced during the heating cycle. From another point of view, a vibrating wire requires more power to heat it to a temperature sufficient to effectuate electrode cleaning and decontamination from the effects of oxidation and other chemical reactions. Therefore, according to an embodiment of the present invention the heating cycle should be separated and maintained distinct from a vibrating cycle. This distinction between cleaning processes may be accomplished by implementing separate heating and vibrating cycles or by partially overlapping heating and vibrating cycles. That is, during an electrode heating period high voltage applied to the corona electrode changes its magnitude. For example, if a nominal operating voltage for producing a corona discharge is equal to 15,000 V, then at the beginning of the heating period the corona voltage may be decreased to 8,000 (i.e., operated in a vibrating mode) and then decreased to zero volts, thus allowing the wire to obtain a temperature sufficient for the silver oxide to convert back (i.e., be chemically reduced) to silver.

It has been experimentally determined that the magnitude of electrical power used to heat the electrode to optimize silver oxide restoration should be gradually increased over the operating life of the electrode. It was found that, during first hundreds of device (i.e., electrode) operating hours, heating power should be increased on the order 1.2 to 3 times with respect to an initial heating power level.

It has further been found that the corona wire is capable of withstanding numerous heating and cooling cycles if heating and cooling is applied "smoothly", i.e. power increases and decreases in a "ramping" or gradually increasing/decreasing manner. The result is best achieved if power smoothly and gradually increases and decreases at the beginning and at the end of the heating cycle and has a substantially flat or constant power level in the middle of the heating cycle. It has also been found that optimal heating cycles are typical for respective compositions and structures of corona wire material and modes of operation. These optimal heating cycle profiles may be stored in, for example, a microprocessor memory so that a microprocessor may control and implement heating cycle profiles appropriate to respective portions of a corona wire life span and the specific materials and configuration of the electrode.

To heat a corona wire to a desired temperature to effectuate cleaning and/or decontamination of oxides takes substantial power since the electrodes are usually heated to a temperature exceeding 200° C. In this case, wire heating may be supported by providing an auxiliary power supply of comparatively small power capabilities so as to heat only a portion of all corona and/or collecting electrodes at any one time. In this case a complete heating cycle consists of several intermediate cycles during which only a portion of each corona wire is sequentially heated in turn. Alternatively, subsets of corona electrodes may be heated during each intermediate cycle. Wire heating may also be accomplished by simultaneously applying an electrical power to all of the corona electrodes. For example, for electrode heating purposes, it is possible to apply commercial AC power directly from the electrical outlet, i.e. 115 V, 60 Hz, to the corona electrodes. In order to control the amount of the power a simple power control device may be provided, such as one using a thyristor (Triac or SCR) much as in a light dimmer used to control room lighting. The dimmer operates in that the power control component (Triac or SCR) is conductive during only a portion of each AC cycle. By controlling this conducting portion of the cycle (otherwise referenced as an angle with respect to 180° as a full cycle) the heating power applied to the corona wires may be controlled. At the same time a simple controlling device such as a microprocessor can store necessary information so as to appropriately change heating power applied to the electrode in accordance with available data (e.g., implement a desired heating profile appropriate to various operating conditions, electrode structure and age, etc.).

As noted, due to thermal expansion the corona wire elongates along its length (and, to some extent, increases in diameter) as it is heated. Depending on the wire's length and temperature increase the wire may sufficiently elongates so as to sag. Sagging may disadvantageously occur to the extent that the corona wire comes closer to or into contact with other wires or parts of the EFA. Needless to say, the resultant short-circuits, arcing, and similar outcomes are undesirable. To prevent sagging and in order to maintain wire straightness, each wire may be supplied with an individual spring or other biasing means for maintaining tension on the wire. Unfortunately, this solution to wire sagging is relatively expensive to implement. In order to maintain the wires straight using a cost effective design, the frame that supports the corona wires may consist of separate parts with different spring or biasing mechanisms and capabilities. Such a corona frame generally has opposing bar-like wire supports to which wires are attached or otherwise mounted/supported and two flat spring-like connecting pieces attached to the bars, outwardly biasing the bars. When the wires are initially attached to the bars the spring-like pieces are slightly bent. When the wires are finally falsely secured to the bars the spring-like pieces are released. These spring-like pieces keep the wires straight even as temperature changes cause their length to vary. Spring action also prevents the corona wires from sagging when the wires are heated to high temperature during a cleaning or electrode decontamination cycle.

For some applications the entire corona frame and corona electrode assembly can be made disposable. This may be desirable because, after some period of time the corona wire deteriorates to the extent that it should be replaced. Corona frame life span may be doubled if the corona frame is made two-sided. That is, the corona wire is applied to both sides of the corona frame. In this case, the portion of the corona wire located on the side closer to the opposing electrodes, e.g., accelerating electrodes, is active. It is this active portion of the corona wire that generates the corona discharge and emits ions toward the accelerating electrodes. The corona wires that are located on the opposite side (or "focus") of the corona frame (FIG. 11) are inactive, i.e. they do not generate the corona discharge since they are located too distant from the opposite accelerating electrodes. These inactive (opposite) wires are not contaminated or deteriorated since they are not in an area of the corona discharge. After some period of time the operating or active wire ages to the extent that it can no longer operate efficiently and cannot or should not be used. At this point, the corona frame may be flipped 180° so that the opposite side wires are positioned near the accelerating electrodes and thereby become active. This arrangement doubles the average life span of the corona frame while incurring only marginal additional expense.

It is also known in the art that ozone converts itself back to oxygen naturally i.e., decomposes to diatomic oxygen. It is also known that rate of ozone conversion to oxygen depends on many factors, a significant factor being temperature. That is, higher temperatures promote decomposition of ozone ($O_3$) into diatomic ozone oxygen ($O_2$). At temperatures above 180° C. the rate of ozone decomposition is high and ozone is converted to diatomic oxygen in a matter of a few seconds or even less. Therefore ozone generation by corona discharge devices may be significantly reduced if air outflow or exhaust from the device passes through an area of high temperature. While passing through the high temperature area ozonated air is heated raising air temperature and thereby promoting decomposition and conversion of ozone present in the air to oxygen. The high temperature time needed to destroy unwanted ozone has been experimentally found to include temperatures above 300° C. such that ozone is completely destroyed 20-50 milliseconds. A feature of the present invention incorporates this effect by causing ozonated air to be directed through a "hot area" in order to destroy the ozone. The time period that the ozonated air should stay within this hot area should be sufficient to ensure that all or almost all ozone is destroyed. Therefore, the distance the outflow air should propagate through a heated area (i.e., "hot area length"), air velocity and hot area temperature should be selected to satisfy ozone destruction criteria. For example, if hot area temperature is 400° C. air may need to spend less time in the area than if hot area temperature is 300° C. Thus, the higher the temperature in the hot area, the shorter in physical length the hot area need be or the higher the air velocity may be.

Another important requirement is that all or substantially all of the ozonated air should pass through high temperature area. That is there should be no leakage or bypass for the air other than through the hot area. Thus, a feature of the current invention includes a hot area that is designed to embrace substantially all airflow exhausted through an outlet of an EFA. This way all air passing through the hot area will be heated so as to attain a desirable high temperature such that substantially all ozone is destroyed. Still another important feature is that the hot area should have sufficient temperature to destroy ozone within its entire volume. If some portions of the hot area are not maintained at a sufficiently high temperature then air that passes through this "cold" portion will still include some non-destroyed ozone. Thus, an important feature of the hot area design is that it provides what may be characterized as a "hot curtain" having a sufficient path length to keep air within this curtain for a time period sufficient to destroy ozone and reduce a level of any residual ozone to a required safe level.

There are several preferable basic configurations for locating and positioning the heating component to provide the requisite hot area. A first concern is determining where the heating components (i.e., filament heater spiral) are to be located downstream from the EFA (see, e.g., FIG. 12). In this configuration accelerated air containing some amount of ozone passes through the heated area for a time "t" that depends on the physical length "s" of the hot area and the velocity "v" of the air through the hot area where t=s/v.

Another configuration is shown in the FIG. 13. Here the heating components are located in between fins of the accelerating electrodes. The heating components heat air in whole area occupied with the accelerating fins. Since the entire length of the accelerating fins (in the direction of air movement) is hot, ozone is rapidly destroyed in this area and ozone free air is discharged and exits from the device exhaust.

Still another configuration is shown in the FIG. 14. As shown, the heating components are electrically isolated from the accelerating electrode's fins. These heating components are provided with an electrical potential that is different from the electrical potential of the accelerating electrodes' fins. Such a device has an improved air cleaning ability since all charged particles entering the area between the accelerating electrodes and heating components fall under the influence of the electric field created by the potential difference between the collecting electrode's fins and the heating components.

Still another feature of an embodiment of the invention includes a modular design concept. According to such a feature, an architecture provides that a set of components including accelerating electrodes, repelling electrodes, heating elements and other components in various combinations in order to produce the most desirable effect, e.g. cleaning, disinfection, deodorizing, fine cleaning, gas destruction, dehumidification, heating and other functions. These components may be installed in the same housing or case same or similar power and control electronics. This modular approach is case considered to be a very cost efficient way of making a variety of different devices employing the present technology.

DESCRIPTION OF THE PREFERRED EMBODIMENTS

Figure 1:
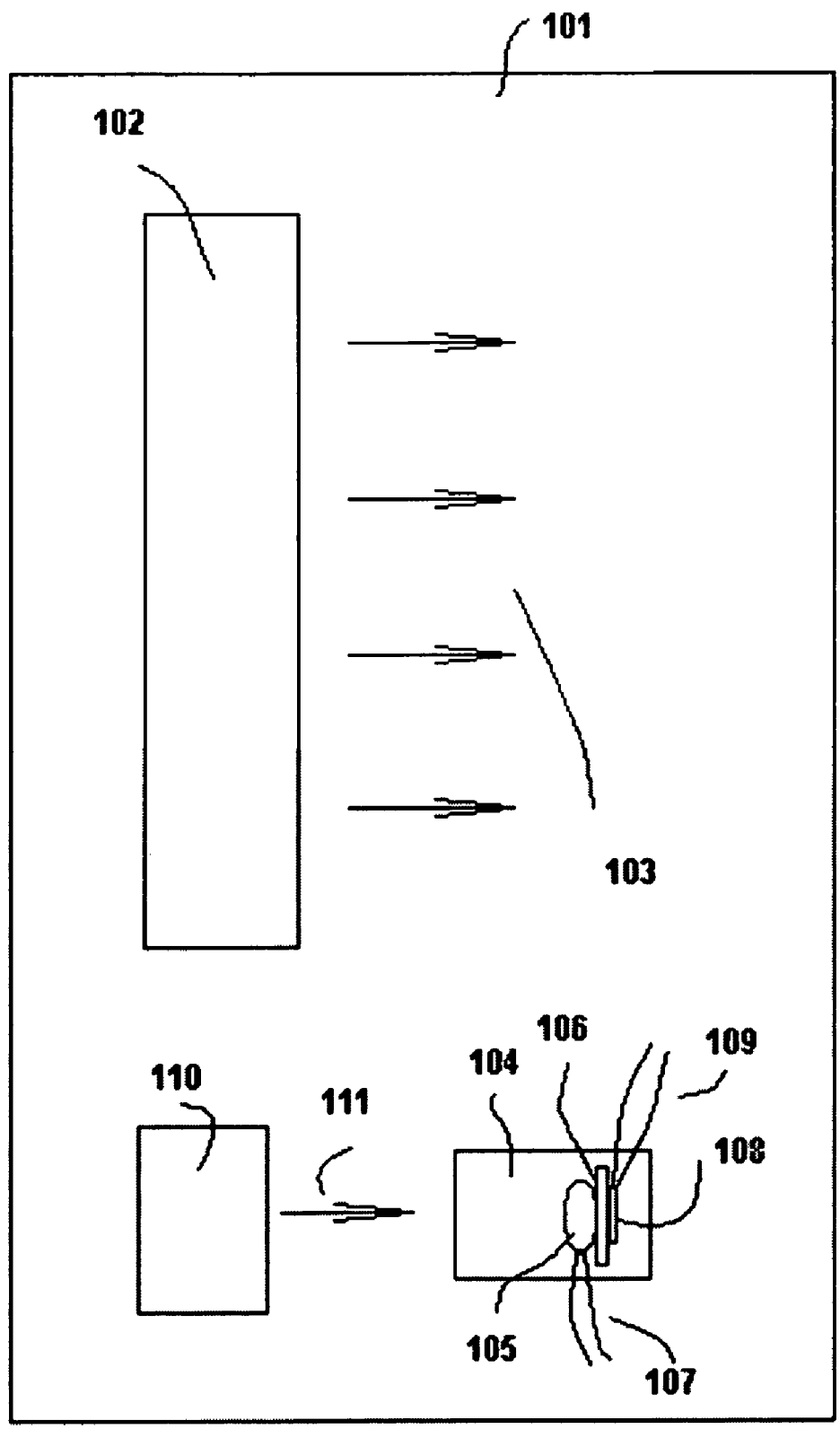
FIG. 1A is a schematic diagram of a prior art electrostatic fluid accelerator (EFA) having an integral ozone detector with the addition of a mechanical fan blowing air through an ozone sensor region of the ozone detector.

FIG. 1 depicts a conventional electrostatic fluid accelerator (EFA) 101 EFA 101 includes array 102 operable to accelerate air in direction 103 by electrostatic force. Complementary to the electrode array 102 ozone detector 104 is included as part of EFA 101. Ozone detector 104 contains a base portion in the form of substrate 106 with ozone sensitive sensor 105 mounted to one side of substrate 106. Heating filament 108 is located on the other side of the substrate 106. Ozone sensor 105 is connected to control circuitry via wires 107. Heating filament 108 is connected to an appropriate power supply (not shown) via wires 109.

Mechanical fan 110 is provided to blow air through ozone detector 104. A typical commercially available ozone detector made by a company such as City Technology (Citytech) requires an airflow of at least 2 liters per minute through sensor 105. Fan 110 should capable to deliver that amount of air. Unfortunately, suitable mechanical fans are noisy and do not provide direct ozone measurement at the device outlet as required by certain standards, e.g., by UL standard UL867.

Figure 2:
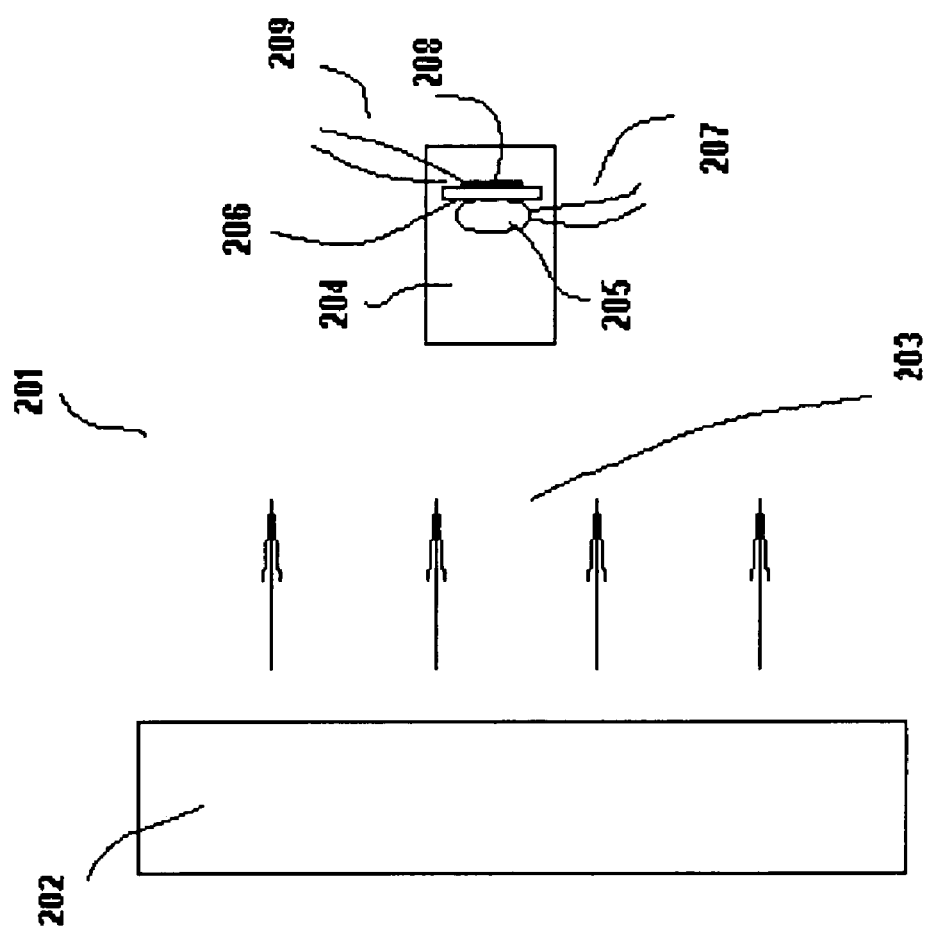
FIG. 2 is a schematic diagram of an embodiment of the present invention including ozone detector located in the air stream generated by the EFA without need for a separate mechanical fan.

In FIG. 2 the EFA does not require a separate mechanical fan to supply air samples, EFA includes electrode array 202 and associated power supply (not separately shown) that are capable of accelerating and moving air in direction 203 by electrostatic force. Complementary to array 202, ozone detector 204 is positioned at an output side of the array. Ozone detector 204 contains a substrate 206 and ozone sensor 205 on one side. Heating filament 208 is located on the other side of substrate 206. Ozone sensor 205 is connected to control circuitry via wires 207. Control circuitry uses ozone level measurements obtained by processing an output signal from ozone sensor 205 so as to operate array 202 in a mode that effectuates a required level of ozone production/ozone reduction. Heating filament 208 is connected to the power supply (not shown) via wires 209.

The air flow generated by array 202 is directed through the ozone detector 204. Air flow generated by array 202 should have a sufficient velocity to deliver the requisite at least 2 l/min of airflow though the ozone detector 204 and, in particular, through ozone sensor 205. If this airflow requirement is satisfied then there is no need to include an additional or auxiliary mechanical ozone sampling fan. In order to satisfy this requirement, a minimal airflow velocity of array 202 should be set at some minimum level that ensures the necessary airflow.

Figure 3:
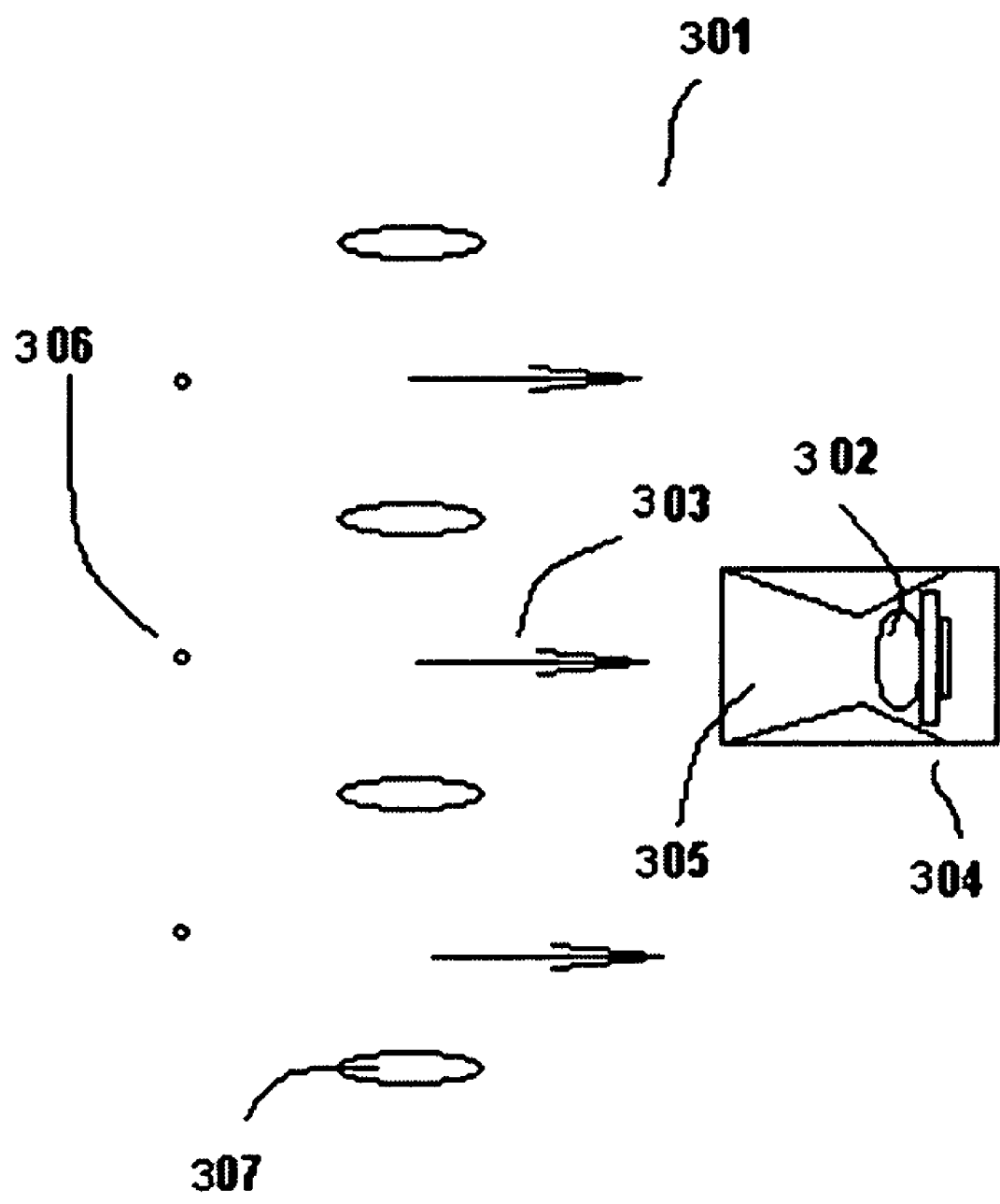
FIG. 3 is a schematic diagram of an embodiment of the present invention with an ozone detector located in the air stream generated by EFA and positioned between the accelerating electrode's fins.

In FIG. 3 ETA 301 is shown including corona wires 306 and collecting electrodes 307 (three corona wires and four collecting electrodes are shown for purposes of the present illustration only, typical devices including large numbers of such electrodes as part of an array). The EFA generates airflow 303 by exerting a force on the air molecules by ion emission from corona electrodes 306. Ozone sensor 302 is located laterally in-between and longitudinally displaced in an airflow direction from collecting electrodes 307, i.e. in a zone of maximum air flow. Ozone sensor 302 has a funnel or cone-like air collection opening 305 to concentrate airflow though ozone sensor 302. This location of the sensor ensures that sufficient air volume will flow through the sensor even at moderate airflow generated by the EFA.

Figure 4:
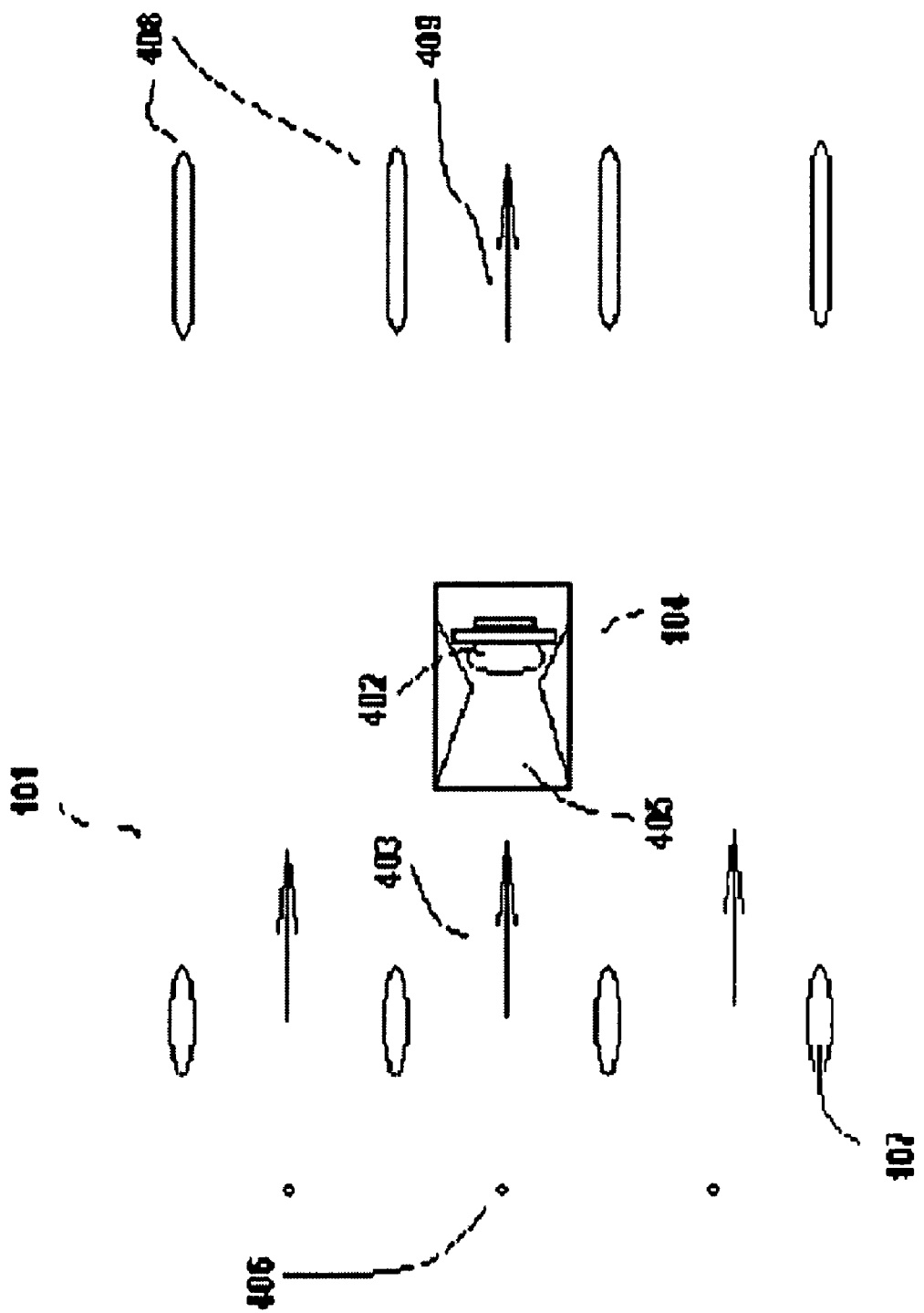
FIG. 4 is a schematic diagram of an embodiment of the present invention with an ozone detector located in the air stream generated by EFA and positioned between the attracting electrodes and a protective grill.

In FIG. 4 EFA 401 is shown including corona wires 406 (i.e., electrodes) and collecting electrodes 407 (three corona wires and four collecting electrodes are shown for purposes of illustration only). EFA 401 generates airflow 403 by exerting a force on the air molecules by ion emission from the corona electrodes. Ozone sensor 402 is located laterally in-between the collecting electrodes, i.e. in a zone of the maximum air flow. Ozone sensor 402 has a funnel or cone-like opening 405 to concentrate air flow though the ozone sensor. EFA 401 also includes a protective grill 408 that is located downstream from collecting electrodes 407. The fins of the grill 408 are substantially parallel to collecting electrodes 403 in such a way that they produce the minimum air flow disruption and restriction to the induced airflow 409. Ozone sensor 402 is laterally located in between the fins of the protective grill. This location of the sensor ensures that sufficient air volume will flow through the sensor even at moderate air flow generated by the EFA.

Figure 5:
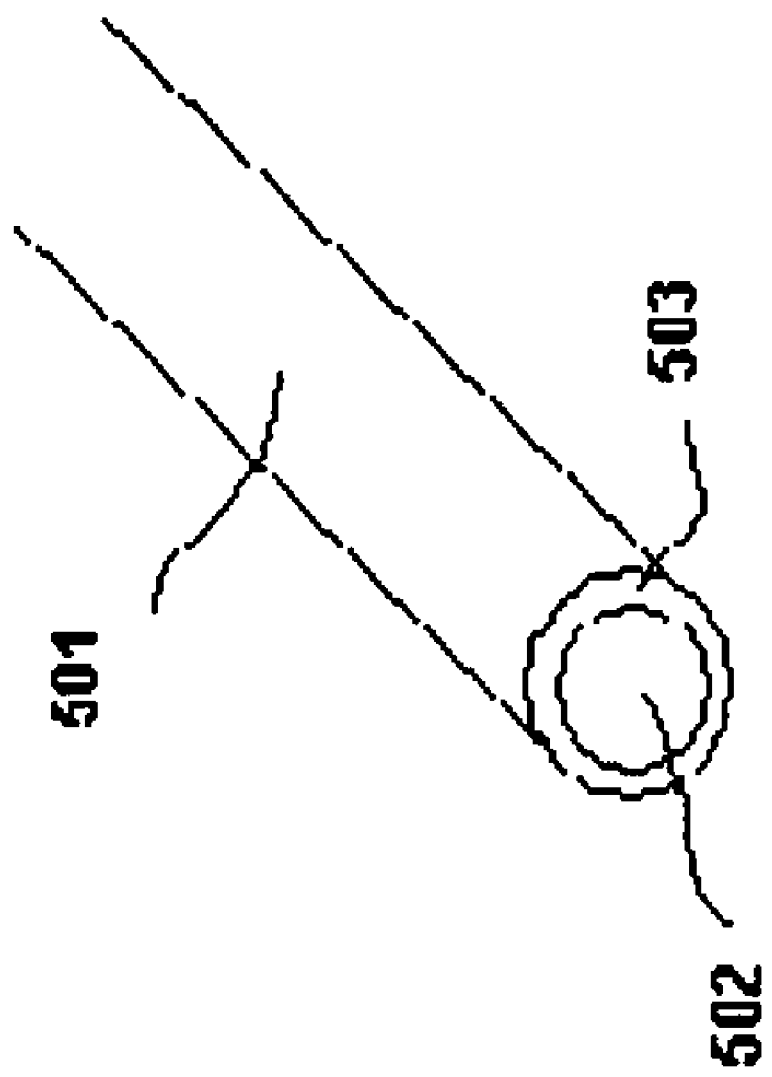
FIG. 5 is a cross section of a layered structure of a corona wire having a central core material and a plated silver outer layer formed on and encapsulating the core material.

Corona wire 501 shown in FIG. 5 consists of a central core material 502 and plated material 503 that covers and encapsulates core material 502. Plated material 503 is selected to minimize net ozone generation such as silver. Central core material 502 should have a coefficient of thermal expansion similar to or slightly less than plated material 503. Suitable central core material include, for example, stainless steel and inconel.

Figure 6:
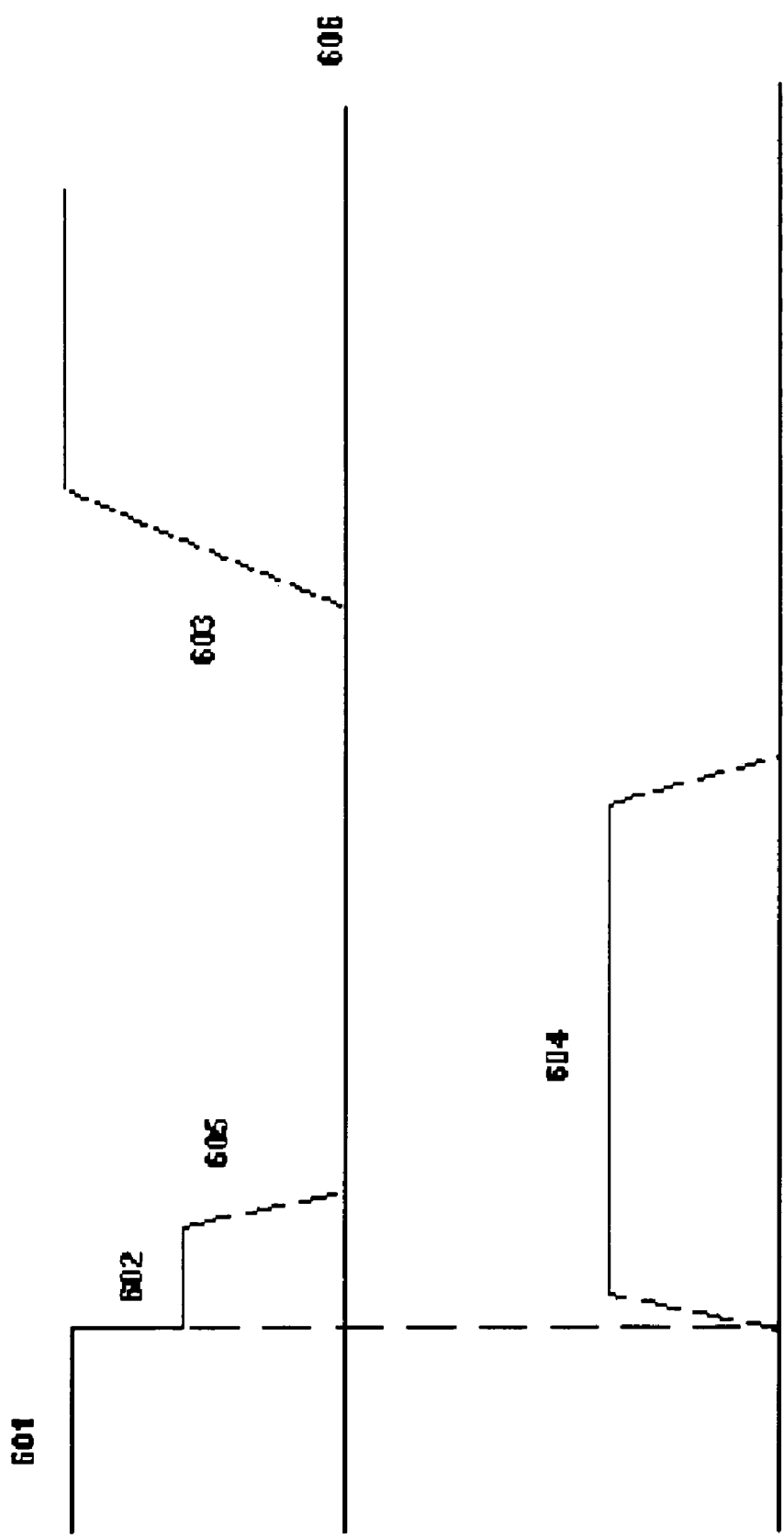
FIG. 6 is a timing diagram showing a heating profile of a corona wire coordinated with a mechanical vibration cleaning process.

FIG. 6 is a timing diagram of the heating and vibration process. In the upper portion of this figure a high voltage timing diagram is shown; in the bottom part of this figure a heating voltage applied across the corona wire is shown. When high voltage used to produce a corona discharge (e.g., 5-25 KV) is at a maximum (or "operational") level 601, no heating voltage is applied to the corona wire. Prior to application of a corona wire heating voltage to the corona wires, a control circuit reduces the high voltage used to produce a corona discharge to some level 602 that is lower than the normal operational corona discharge voltage level 601 (e.g., 8 KV versus 15 KV). When heating voltage 604 is applied to the corona wire the wire sags due to thermal expansion and is pulled toward the opposite (collecting) electrodes by the electrostatic force exerted by the reduced corona discharge voltage 602. Being impacted by this force the wire starts to vibrate at a relatively high frequency until high voltage 603 is again applied. After several seconds of wire vibration the high voltage is decreased over some period 605 to a low level, such as zero, at which time the vibration stops. After that the wire is heated for some time with voltage 604. After the heating process is completed, voltage 604 drops to zero and high voltage 603 is increased to the normal operational level. The vibration process helps to remove a contamination form the corona wire.

Figure 7:
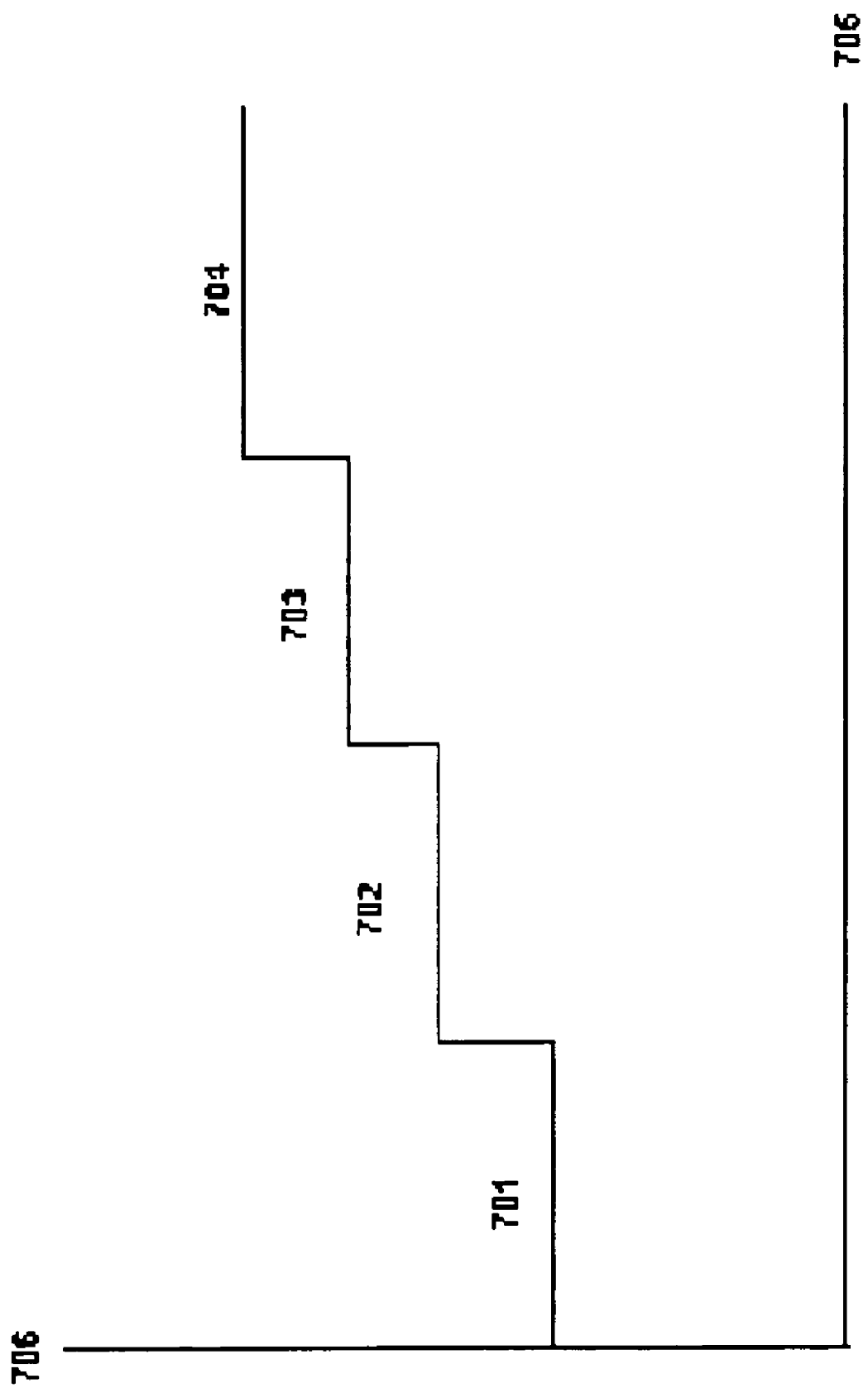
FIG. 7 is a timing diagram showing heating power levels used to effectuate corona wire cleaning over the life-time of the wire.

FIG. 7 is a timing diagram of the corona wire heating process. A voltage amplitude is represented along the Y axis 706 as applied to the corona wire, X axis 705 represents time. It should be noted that, for the simplicity of a discussion, voltage magnitude is shown with an uninterrupted, continuous line while, in a reality, this voltage is applied periodic, reaching levels 701, or 702, or 703, or 704 for a short period of time. When the corona wire is heated first the voltage across the wire is equal to 701 thereby generating a correspondingly low current level through the corona wire and resulting in a relatively low level of corona wire heating and temperature rise. It has been experimentally determined that this low temperature (e.g., 180 C.) is sufficient to restore silver oxide back to silver for a relatively new wire. After a certain period of operation (e.g., hours or cleaning cycles) the voltage across the wire should be raised in order to increase the current through and power supplied to the wire and therefore the resultant temperature. This voltage increase may be implemented gradually and steadily over the life cycle of the affected corona wires or by discrete increases with several steps as it is shown in FIG. 7.

Figure 8:
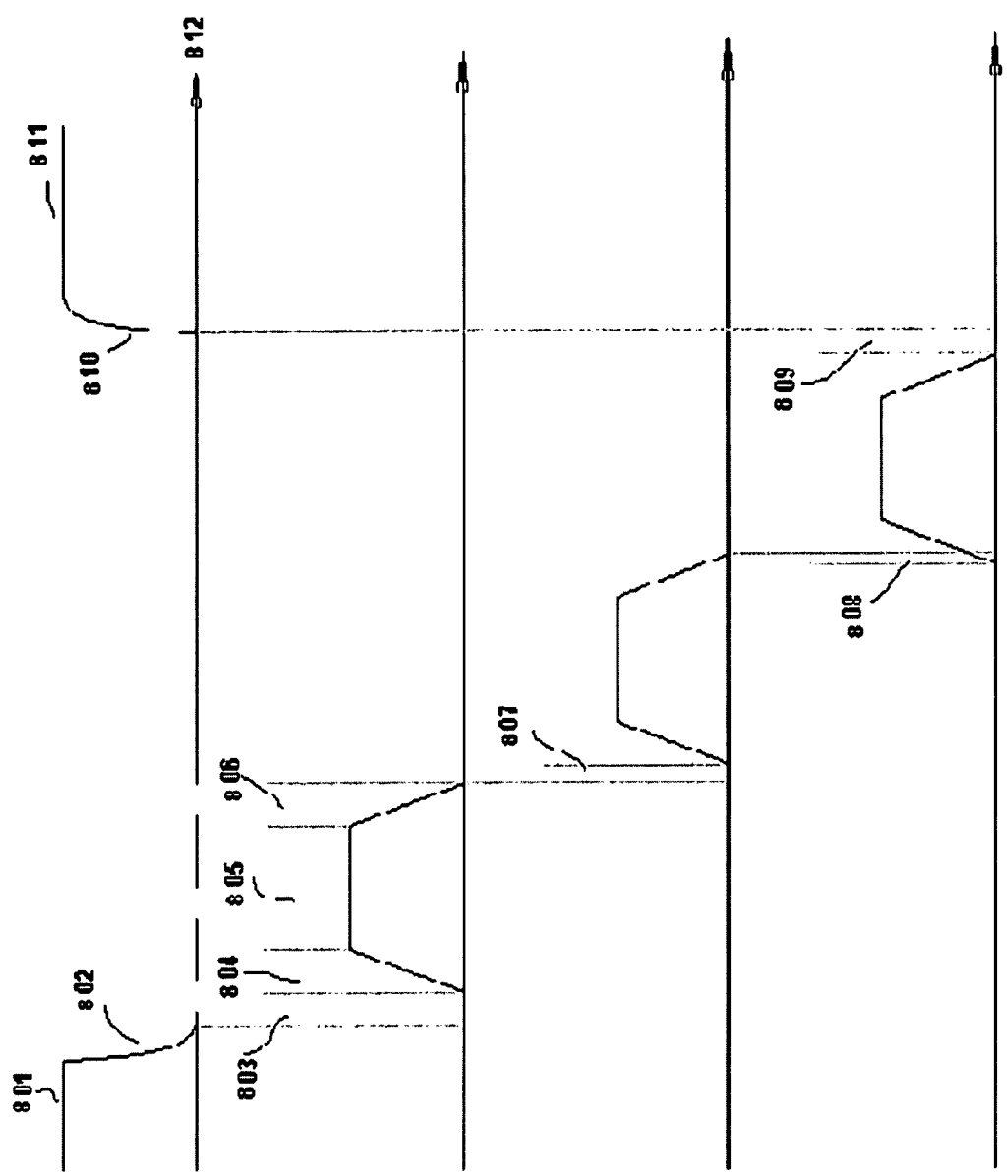
FIG. 8 is a timing diagram of corona wire heating.

FIG. 8 is a timing diagram for the heating process when corona wire heating is performed for individual portions of the corona wires during respective intermediate heating cycles. The Y axis represents the applied voltage for each wire portion wherein voltage level 801 represents operational high voltage applied between the corona and the collecting electrodes of the EFA. Periodically, this voltage drops to zero level (802). After some time 803 the heating voltage may be applied to that portion of the corona wire. It should be noted that time 803 may be positive or negative whereby in the ease of the latter, there is some overlap between the application of the high corona discharge voltage 802 and corona wire heating voltage (or current). This heating voltage initially gradually and continuously increase through the ramp 804 to some maximum level 805, then ramps down (806) to low or zero level. After a certain time 807 (which may also be positive or negative, i.e. overlapping with voltage 806) a next portion or segment of the corona wire is heated. Each wire portion goes through the same process of ramping up, a relatively constant voltage heating, and a ramping down segment. This process ensures uniform mechanical force is applied to the wires. Time gaps between the separate wires heating 807 and 808 may be positive, or negative, or equal to zero. After all the wire portions are heated and short time gap 809, high voltage raises 810 to the operational level 811.

Figure 9:
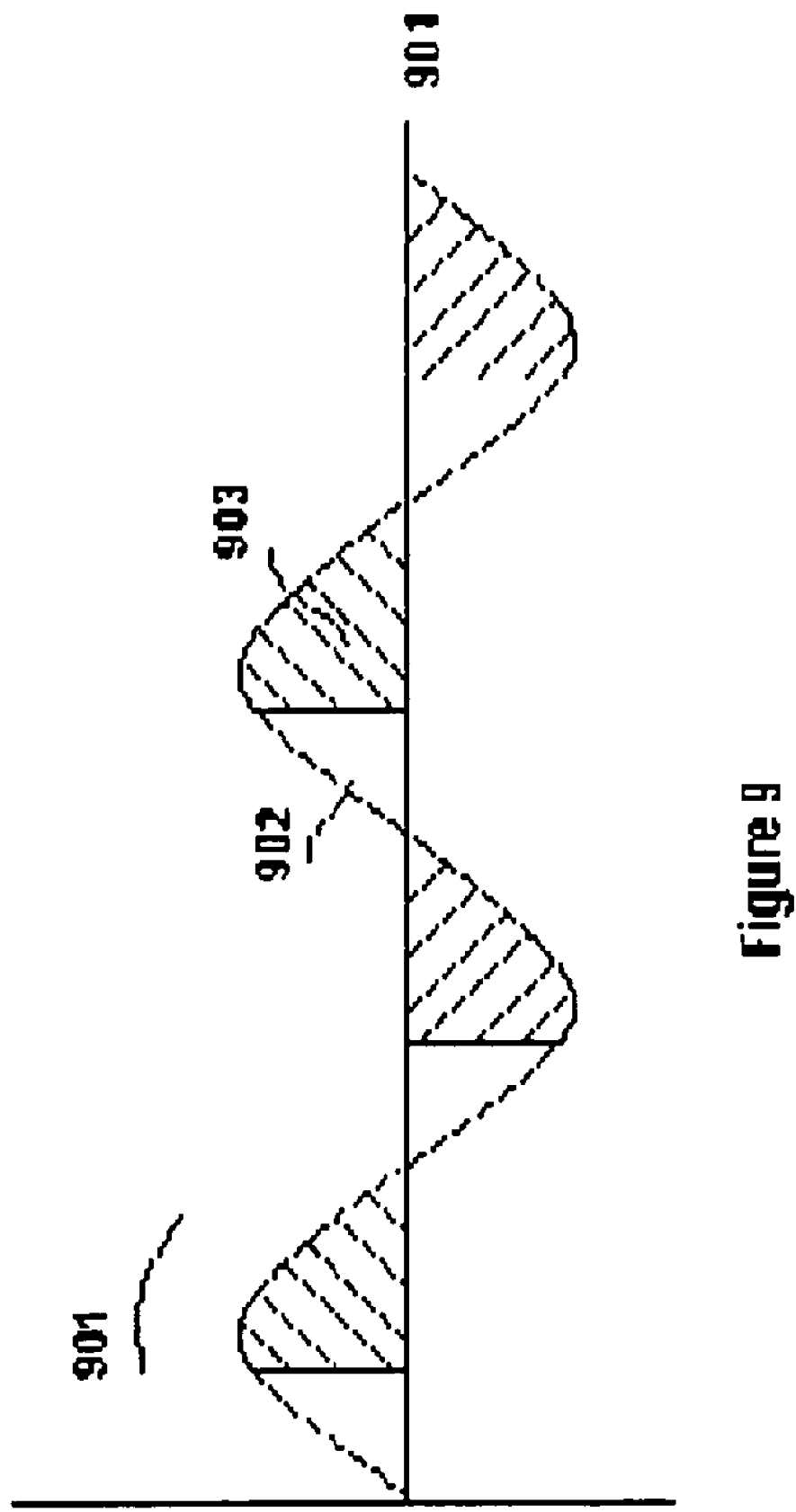
FIG. 9 is a timing diagram of the corona wire heating using a dimmer-like heating power control device.

FIG. 9 is a timing diagram of the voltage applied across the corona wire during the heating process. Voltage 901 is applied to the corona wire via an appropriate control circuit or device such as an SCR or Triac as used in a dimmer-like device. Such a device may be operated to selectively block or interrupt a current flow until a gate voltage is applied whereby a remaining portion of the waveform during that half cycle is applied to a load such as corona wire. This effectively cuts a portion of the input sinusoidal voltage and decreases its RMS value to the necessary level. In this figure sinusoidal voltage 901 is cut in such a manner such that voltage portion 902 is cut-off (i.e., blocked) while voltage portion 903 is applied to the corona wire. By changing the angle of voltage cut a RMS value of the voltage applied to the corona wire is controlled and wire temperature may be maintained at the required level.

Figure 10:
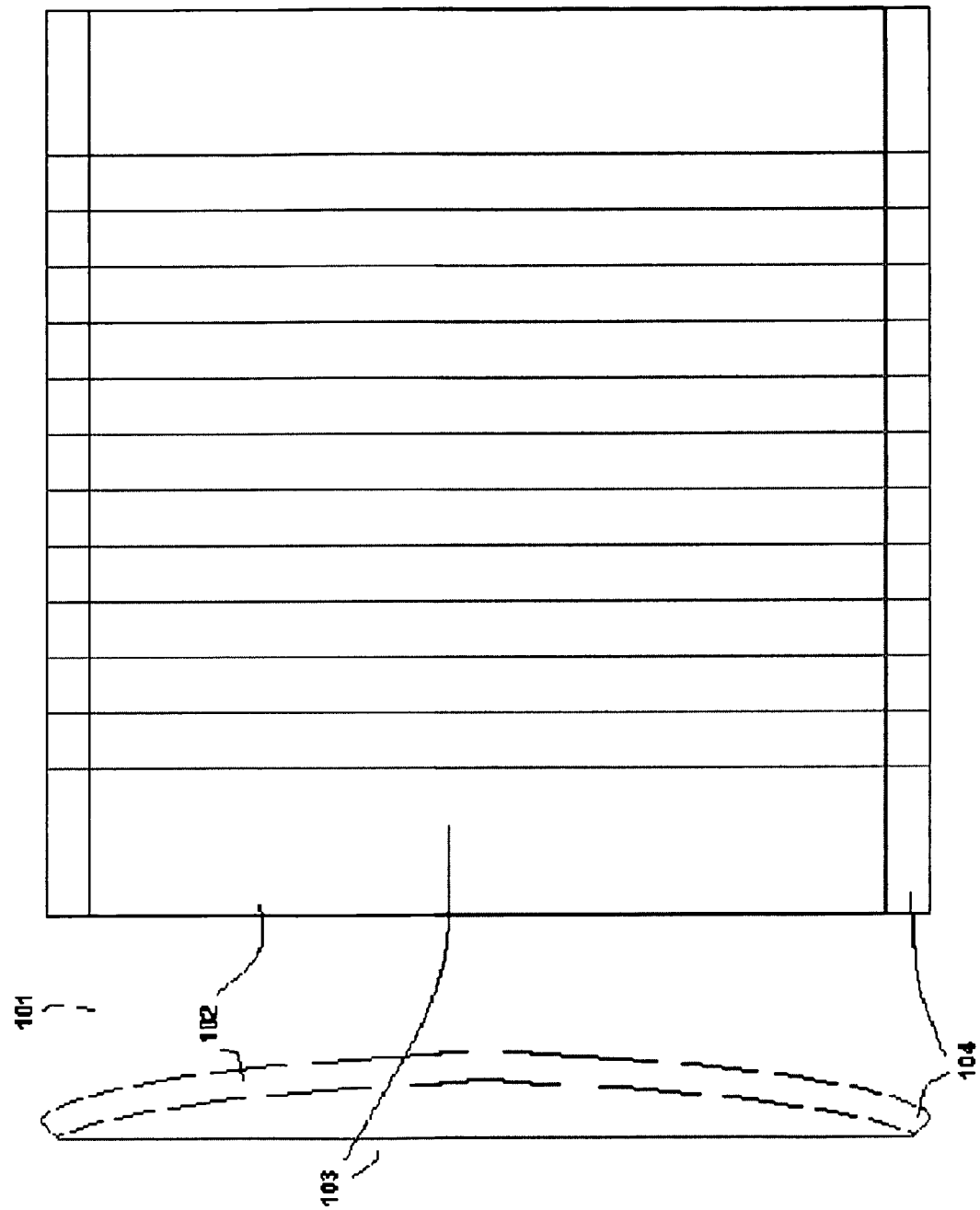
FIG. 10 is a schematic diagram of a corona electrode array including a spring-like corona electrode frame.

FIG. 10 is a schematic of a springy corona frame 101 for supporting an array of corona electrode wires under mechanical tension. Frame 101 consists of two parallel horizontal bars 104 and two vertical leaf spring-like components 102. Corona wires 103 are attached to horizontal bars 104. During the assembly the springy components are slightly bent in a special jig. After all the wires are attached the jig is released and leaf-spring-like components 102 partially extend keeping corona wires 103 taught and straight under tension supplied by springs 102 which remain somewhat bent. During the heating process corona wires 103 elongate and sag due to thermal expansion. The springy components 102 further extend so as to keep the wires from sagging excessively that would otherwise allow uncontrolled movement and displacement into closer proximity to or contacting each other, opposite (e.g. collecting) electrodes, the frame structure, or other parts of the device.

Figure 11:
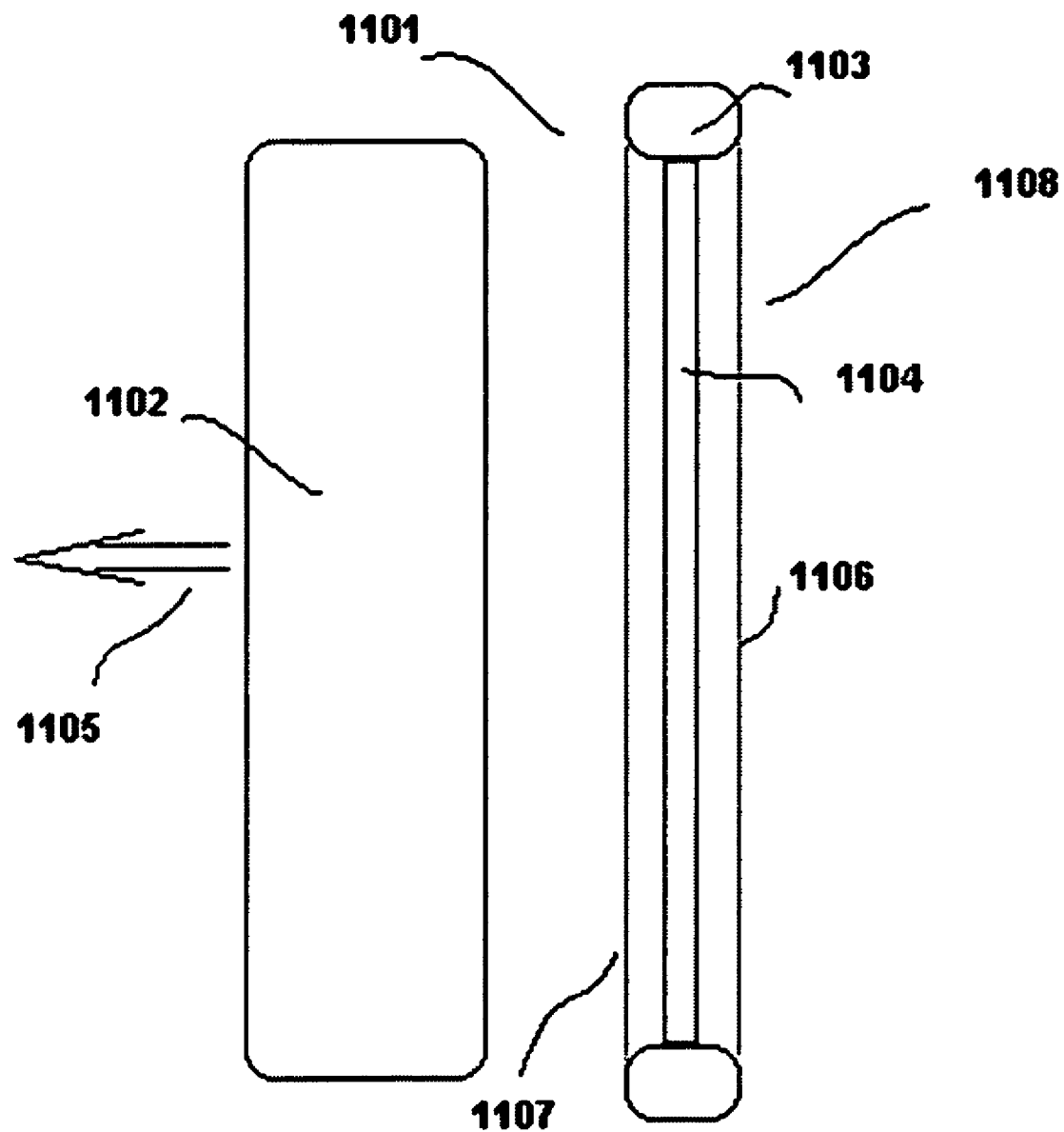
FIG. 11 is a schematic diagram of a corona electrode array assembly with a double-side corona frame and corona electrode assembly.

FIG. 11 depicts EFA 1101 with double sided corona electrode array. EFA 1101 depicts includes collecting electrode 1102 and the corona electrode wires 1108. High voltage is applied between those electrodes: As a result, airflow is created in the direction shown by arrow 1105. The corona frame consists of two horizontal bars 1103, two vertical supports 1104 and two sides of the corona electrode wires 1108. The portion of corona electrodes wires 1108 that are closest to collecting electrode 1102 are designated as the active portion of the wire-1107. The portion of corona electrode wire 1108 that is furthest from the collecting electrode 1102. inactive side 1106, does not operate to produce a corona discharge because it is located at a distance from collecting electrode 1102. During operation only active side 1107 creates a corona discharge and emits ions. As such, wire 1107 degrades or "ages" much faster than inactive wire 1106. After a certain period of device operation (e.g., some combination of operating hours, cleaning cycles, etc.) active wire 1107 ages and its operating effeciancy degrades to the extent that it can not be used any further. At that time the user can rotate the corona electrode so the inactive side 1106 will be now be positioned in close adjacent proximity to collecting electrode 1102 and previously active part of the corona wire 1107 will be on the inactive side away from the accelerating electrodes. Now the unused part of the corona wire 1106 will be active. This configuration doubles the corona wire life expectancy and minimizes device operating costs.

Figure 12:
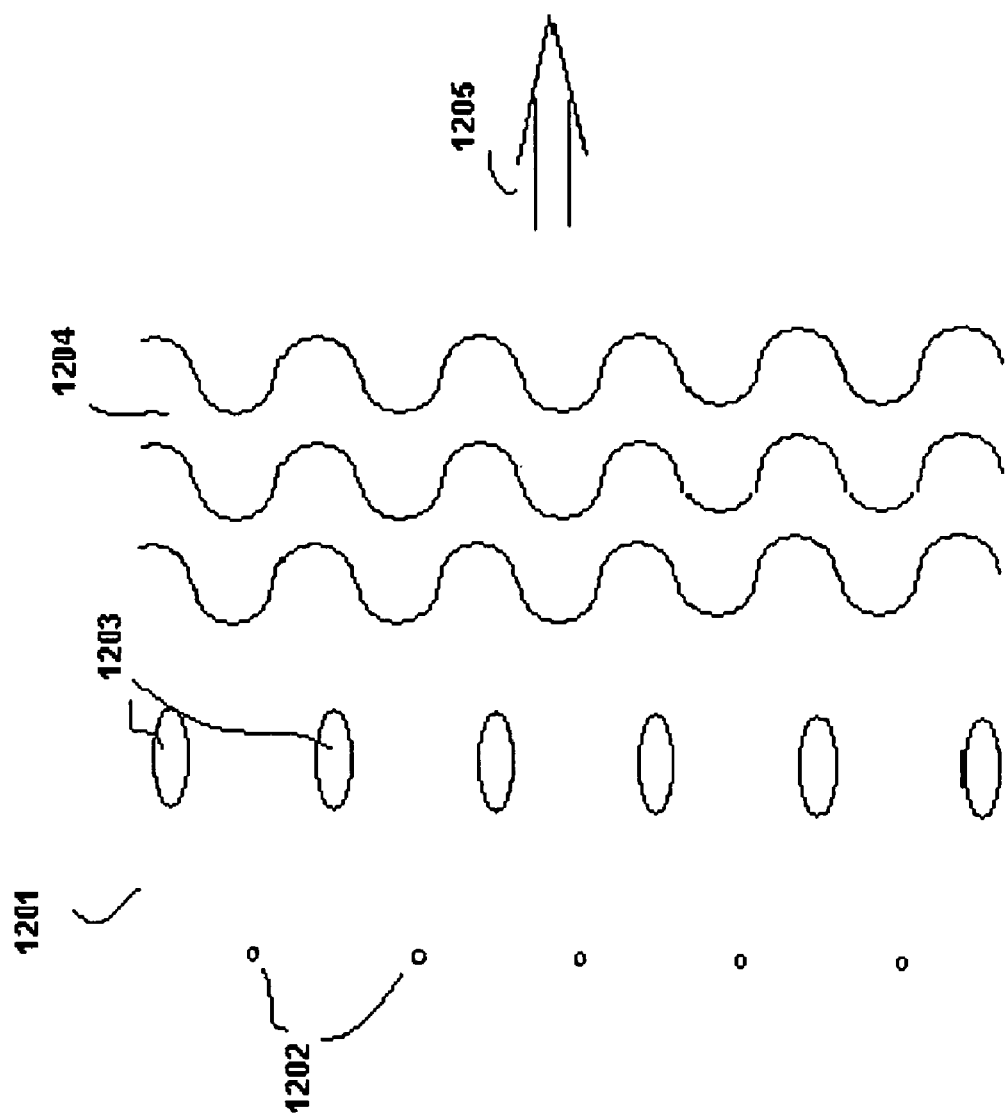
FIG. 12 is schematic diagram of a space heater device implementing an EFA induced air flow.

FIG. 12 depicts a space heater using an EFA. Space heater 1201 includes corona wires 1202 and collecting electrodes 1203. When a corona discharge enabling high voltage is applied between the electrodes an airflow is induced in the direction shown by the arrows 1205. This airflow generated by the corona discharge contains a certain amount of ozone created as a result of ionization of the air by the corona discharge. In certain eases the ozone concentration is not safe or desirable for human beings. It is therefore desirable to reduce the amount of ozone generated to some negligible level, possibly to zero. Note that heater component 1204 (e.g. electrical heating elements such as high resistance heating wires including Nichrome, Kanthal, etc.) is located downstream from corona electrodes 1202. Ozonated air passes through the heated components and the area where the air is heated. The resultant high temperature destroys the ozone, the ozone destruction efficiency depending on the length of time the ozonated air is in the hot area and a temperature of the hot area. Higher temperatures result in less time being required for ozone destruction. It has been experimentally determined a conventional electrical space heater is capable of developing a sufficiently high temperature to destroy almost all ozone in air in less than a second. A critical concern is that some air may escape or bypass the hot area and pass through comparatively cold areas where ozone destruction level is insufficient. Therefore, it is a desirable that the space heater not allow air to by-pass an ozone destroying hot area or be subjected to temperatures existing in the hot area for less time than it is necessary for adequate ozone destruction. At the same time the heater components should not create an air resistance sufficient to cause substantial bypass of air around the hot area. For example, a conventional coil-like heater filament can heat air to a sufficiently high temperature and still be almost transparent to airflow.

Figure 13:
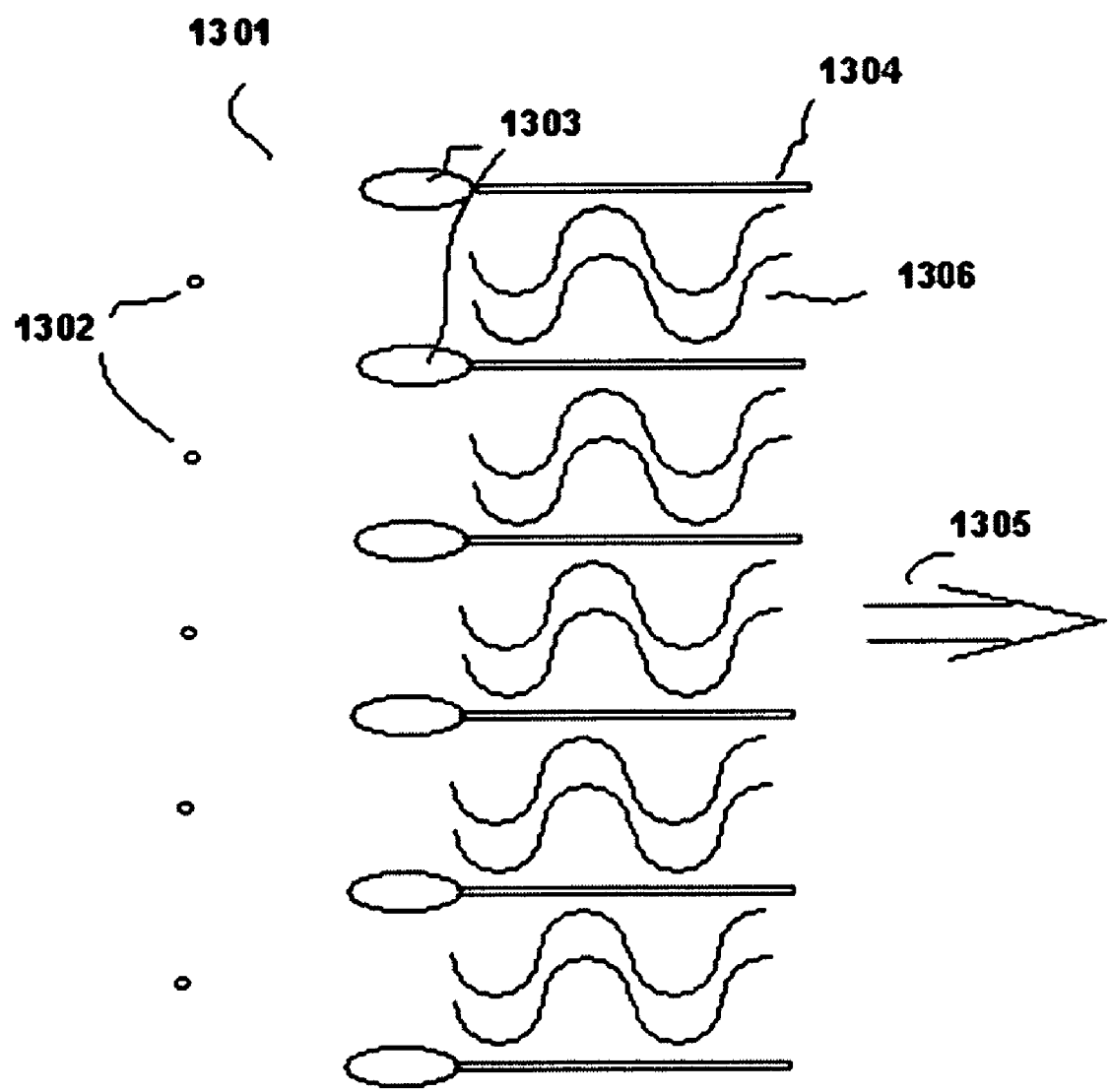
FIG. 13 is a schematic diagram of another version of a space heater implementing EFA induced air flow.

FIG. 13 depicts another embodiment of a space heater. EFA 1301 includes corona wires 1302 and collecting electrode. The collecting electrodes consist of a round or oval front portion 1303 and thin, plate-like rear fins 1304. When a high voltage is applied between the electrodes an air flow is induced in the direction shown by the arrows 1305. Ozonated air passes in-between rear fins 1304. In this area the heater components 1306 are located. It is schematically shown that the heater components occupies substantially all the space between the fins. At the same time these heater components 1306 are comparatively transparent to the airflow and do not create a large air resistance. An example of appropriate heater components are taken from a conventional coil-like heater filament that heats air to high temperature and appears substantially transparent to the airflow.

Figure 14:
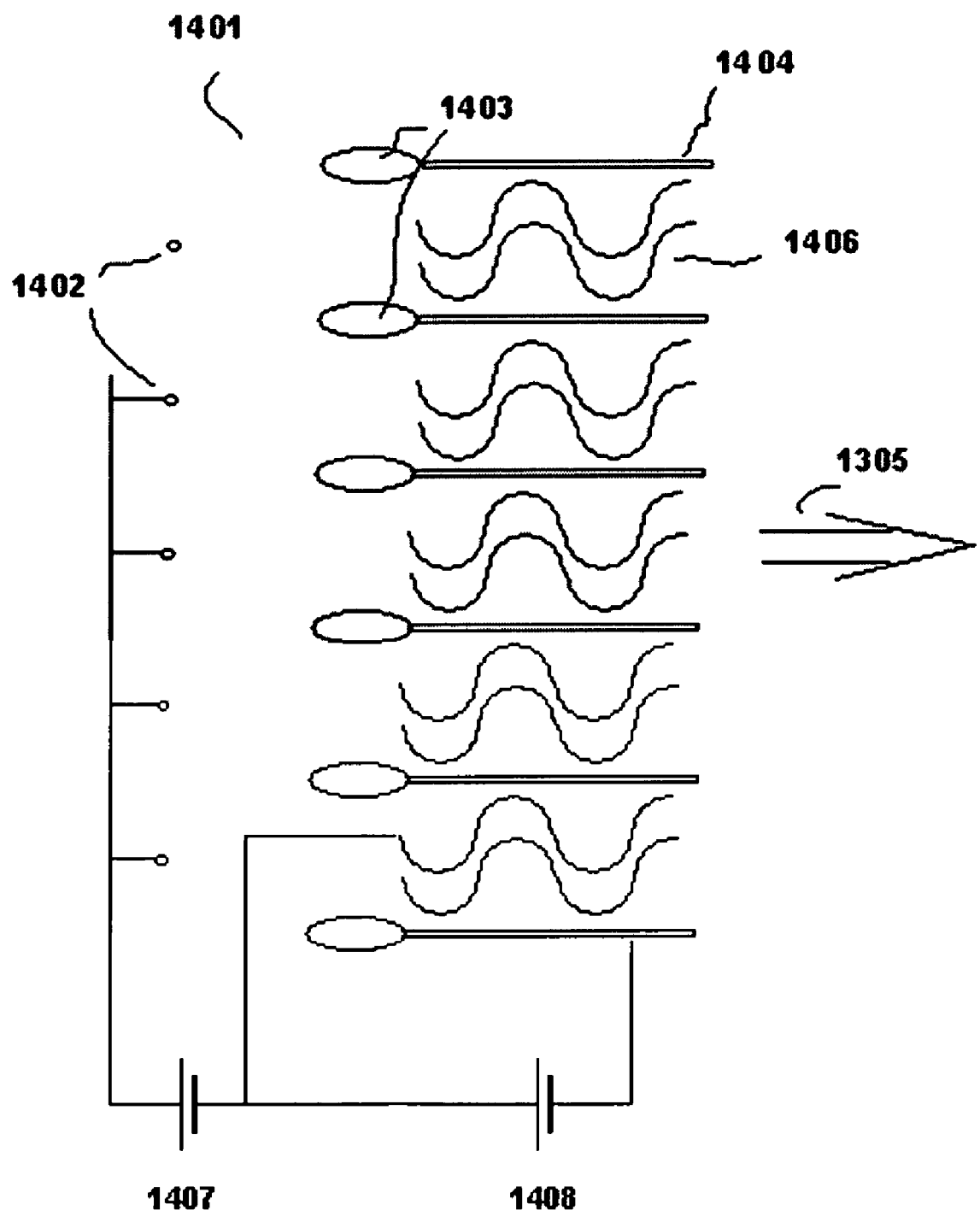
FIG. 14 is a schematic diagram of still another version of a space heater implementing EFA induced air flow.

FIG. 14 is yet another embodiment of a space heater. EFA 1401 includes corona wires 1402 and collecting electrodes. The collecting electrodes consist of the round or oval front portion 1403 and thin rear fins 1404. When a high voltage is applied between the electrodes an air flow is induced in the direction shown by the arrows 1405. Ozonated air passes in-between rear fins 1404. Heater components 1406 are located in the area between rear fins 1404. When air passes corona electrodes 1402 air contaminants such as particulates suspended in the air are electrically charged by the corona discharge. Some of the particles are attracted to collecting electrodes (1403 and 1404) and settle thereon. If charged particles travel between collecting electrodes having the same electrical potential then the particles will not be attracted to the collecting electrodes. The reason is that there is no electrical field created between flat surfaces maintained at equal electrical potentials. In the absence of an electrical field there is no electrical force applied to the electrical charges. In order to improve the particle collecting efficiency an electrical field should be introduced in the area or space between the collecting electrodes fins 1404. In order to do so, an electrical potential that is different from the potential of the collecting electrodes' potential should be applied to the heater components 1406.

This electrical potential may be generated by high voltage power supplies 1407 and 1408. It is assumed in all the Figures that all the corona electrodes have substantially same potential and all the collecting electrodes are at the substantially same electrical potential. It is further assumed that all the heater components 1406 in the FIG. 14 are at the substantially same electrical potential.

It is further assumed that the collecting electrodes themselves may serve as the heater components so as to add to the efficiency of the device and make it more cost effective and a smaller size. In order to do so, all the collecting (at the same time heater components) are placed at an electrical potential that is close to ground or neutral potential, while all the corona electrodes are provided with a high electrical potential. The preferred high electrical potential is a positive direct current (dc) value and positive since positive dc has been found to minimize the amount of ozone created by the resultant corona discharge.

Figure 15:
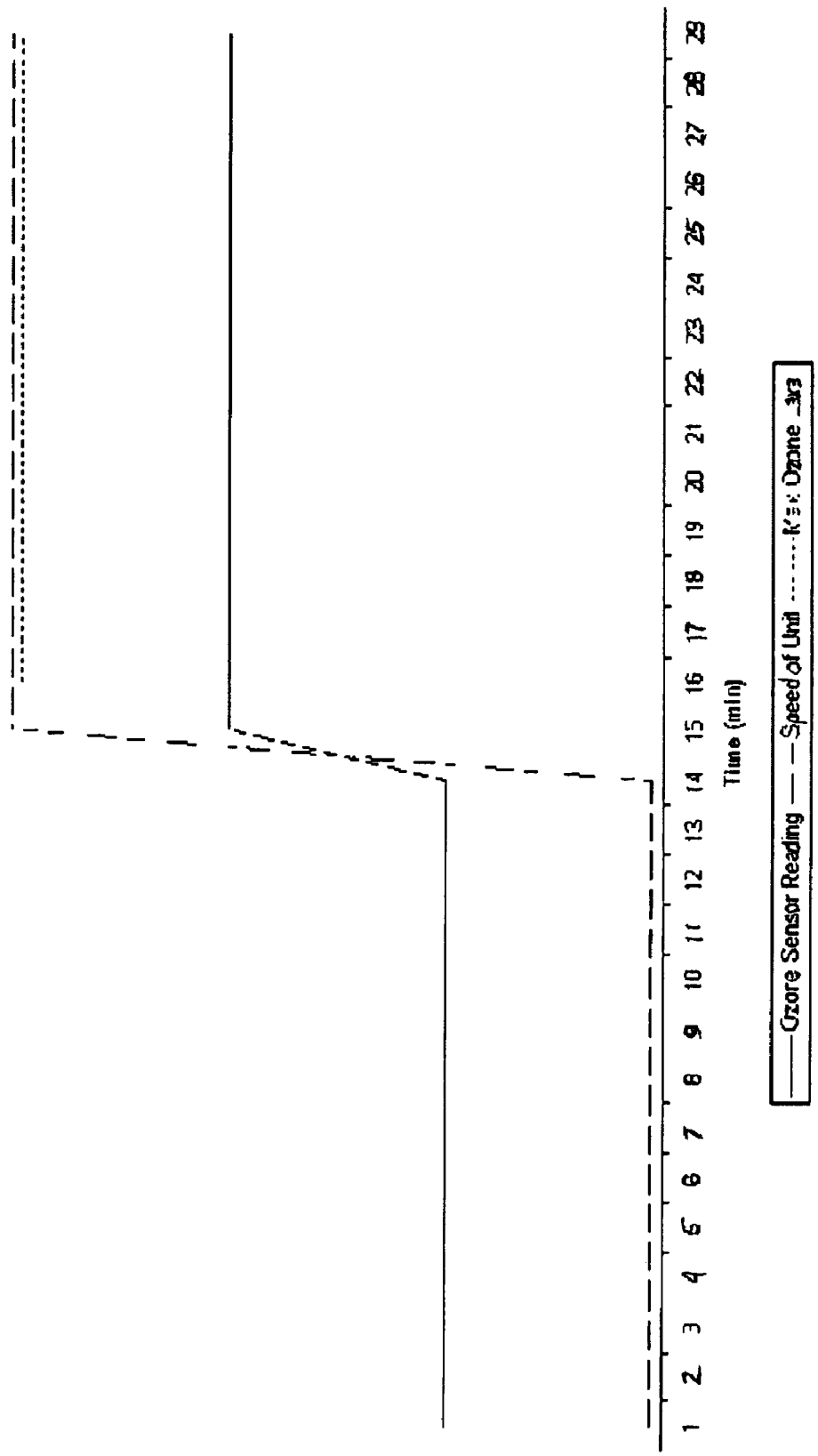
FIG. 15 is a graph of ozone concentration versus time during operation of a conventionally operated EFA in an ideal, ventilated room.
Figure 16:
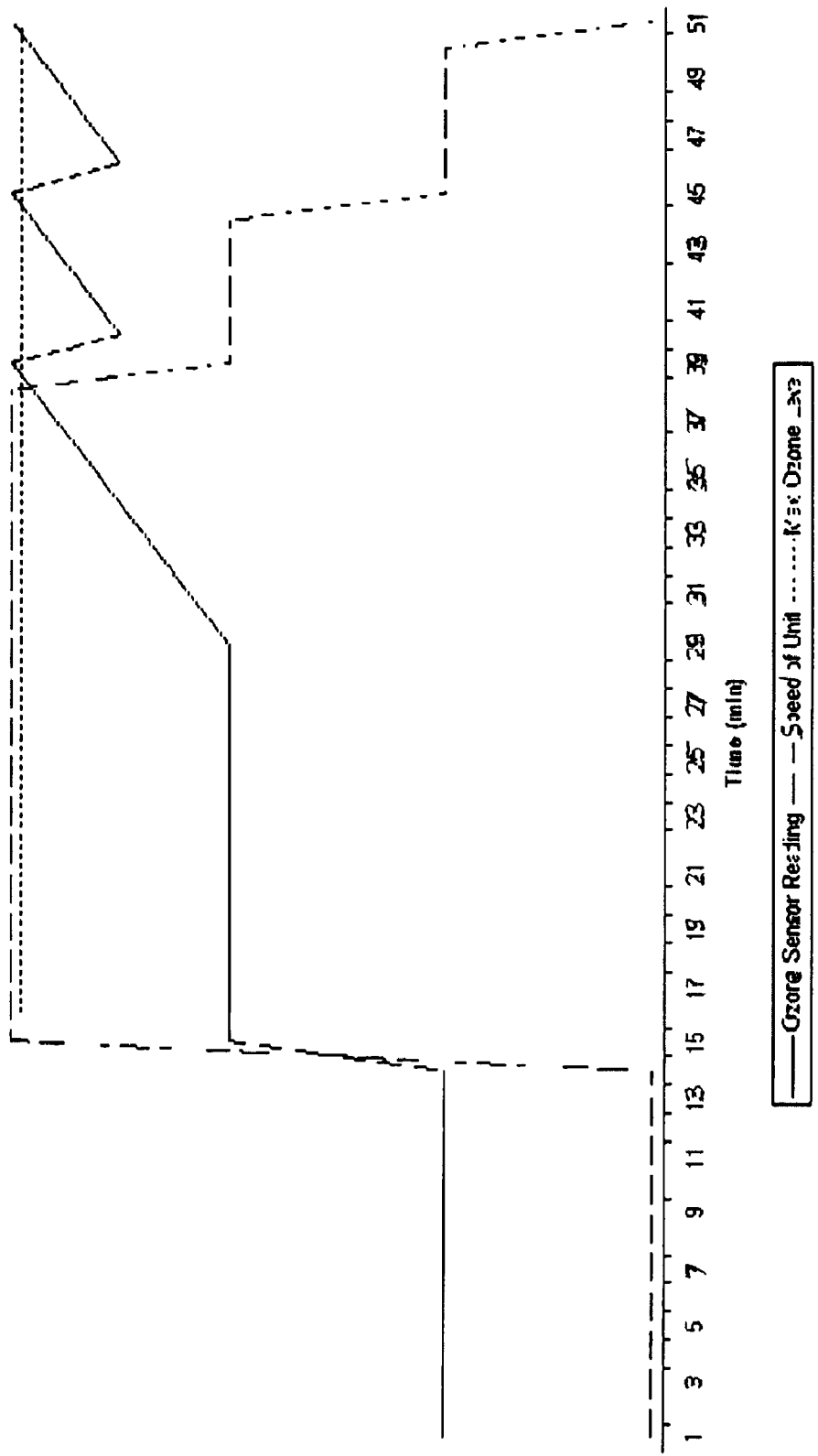
FIG. 16 is a graph of ozone concentration versus time during operation of a conventionally operated EFA in an a worst case environment of a small, unventilated room.
Figure 17:
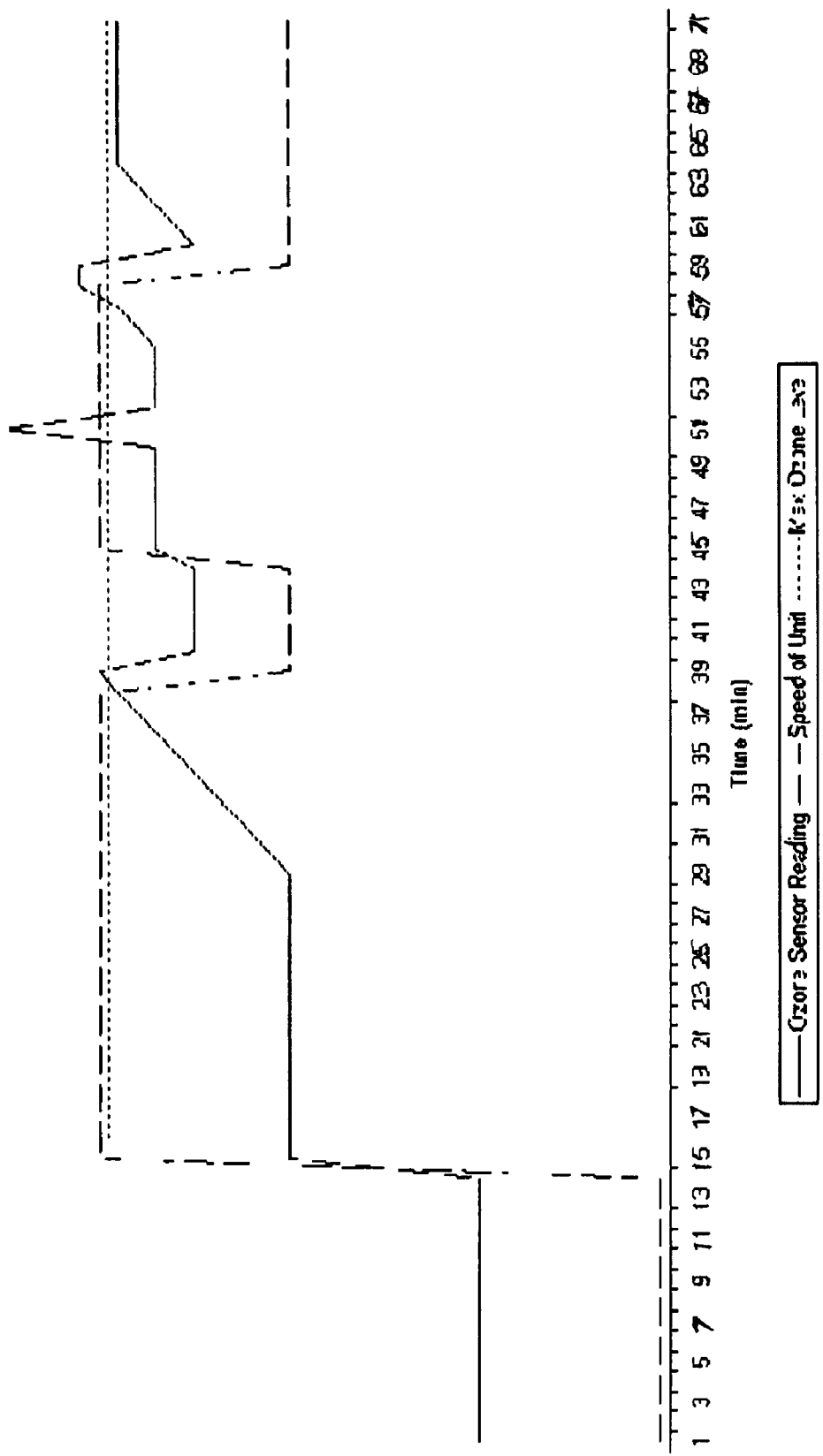
FIG. 17 is a graph of ozone concentration versus time during operation of an embodiment of an EFA according to the invention under and in response to various operating conditions and events.

FIGS. 15-17 are graphs depicting ozone concentration as detected by an ozone sensor located at the output or exhaust of an EFA unit and power level or speed of the EFA over time shown in minutes. A threshold safe/unsafe concentration level of ozone is also shown. Thus, the graphs show what happens to the unit as ozone level increases (Black Line) and how the unit reacts by changing the speed (Long dashed lines). The short dashed line represents the aforementioned threshold value representing a ozone maximum level that the unit calculates after the calibration cycle. Typically this value is a small amount below actual unsafe level to provide buffer as ozone rises. For example, if unsafe level is 50 ppb, the threshold could represent 40 ppb. In the figures, a 15 minute calibration was chosen during which the unit does not turn on so that a 0 ozone value for the sensor can be determined.

Ozone concentration will depend on several factors including the rate of ozone produced by the EFA as a function of its operating power level, volume of air in a room, ventilation causing a periodic exchange of air from within the room with outside air, any decay rate for the ozone, etc. For example, ozone concentration for an ideal or perfect room configuration is depicted by the graph of FIG. 15. When, according to some embodiments, the ozone sensor (i.e., detector) is located at the output end (i.e., immediately downstream) of an electrode array, the ozone concentration level measured is dominated by local effects, i.e., the output level of ozone presently being generated by the electrode array rather than the long-term, ambient ozone concentration level present in the room overall. To optimize device operation and minimize erratic operation caused by transient and/or short-term, local ozone concentration effects and levels, various techniques may be implemented to identify a particular room operating environment. Identification of room operating environment provides for appropriate interpretation of the output from the ozone detector or sensor as it relates to and is indicative of an ambient concentration level of ozone in the overall room. For example, a room operating environment my be classified as having a relatively small, enclosed volume of air while another a large volume that is vented to and is in frequent air exchange with the outside.

Instead of reacting to momentary and/or localized ozone concentration levels, an instantaneous output from the ozone detector or sensor is monitored and interpreted by a controller (e.g., microcontroller) to identify a trend in a concentration level of ozone in the room air. The ozone concentration trend may then be used to operate the electrode array to maintain the average room ozone concentration level below a predetermined threshold value.

This ideal room is assumed to be well ventilated to the outside such all ozone present is a result of that produced by operation of the subject EFA device or unit. In such a situation, as can be seen from the graph, a calibration procedure is implemented during the first fifteen minutes to determine the threshold value. As shown by the graph, the ozone level in the room stays somewhat constant and then, at the fifteen minute mark, rises quickly as the unit turns on to maximum power, leveling off to some constant, higher but safe concentration level, dependent upon EFA operating speed.

A "worst room" scenario results in the ozone concentration levels depicts in the graph of FIG. 16. Here it is assumed that a conventional EFA is operating in a small, unventilated room in which the ozone concentration can be shown to increase over time. Again, upon initiation of EFA operation, calibration of the ozone sensor is also initiated. After calibration is completed, there is a short plateau before the ozone concentration level begins to rapidly rise around minute thirty of operation. Upon reaching some unsafe level of ozone concentration around minute 39, EFA unit operating power or speed is reduced a first step in a programmed attempt to reduce the ozone concentration level back down to some safe level. Immediately after and in response to the speed reduction there is significant drop in the ozone concentration level reading because the ozone sensor is located at outlet so that it detects an ozone level equal to a background ozone concentration level plus the ozone presently being generated by the EFA. Since the reduction in EFA power causes an almost immediate reduction in the level of ozone being generated and thereby detected by the ozone sensor, the resultant ozone sensor reading plummets. However, after some period of time, the ozone concentration level detected by the sensor once again starts to build up again reaching the predetermined threshold indicating an unsafe level so that EFA unit power is again reduced by a second increment. This cycle of detecting a threshold high ozone concentration, reducing power, observing an immediate decrease in ozone concentration, and having the ozone concentration as detected by the ozone sensor gradually increase or build back to near the original sensed level continues until the EFA power is eventually reduced to some low or zero level and the unit is shut off because ozone levels are just not safe for this room environment.

FIG. 17 is a graph of ozone concentration versus time during operation of an embodiment of the invention, demonstrating how various events can be handled by the unit in a "random room" environment. This example illustrates how various conditions and events can be handled by the unit. To optimize operational efficiency and minimize erratic operation, a device controller may include logic implemented as software or hardware and configured distinguish (i) transitory ozone concentration values received from the ozone sensor that are indicative of short-term, local concentration effects from (ii) trend-indicative ambient concentration values indicative of overall room ozone concentration effects. By minimizing or eliminating the effects of the former, i.e., localized/transitory sensor readings, in favor of extrapolated or otherwise calculated ambient ozone concentration levels, the controller may operate the electrode array to maintain an overall room ozone concentration level below a predetermined threshold value and/or not exceeding some maximum safe threshold value. Note that, preferably, control by adjustment of power supplied to the electrode array is performed dynamically in response to various ozone concentration readings and calculations and may include incremental and/or gradual adjustment in and to power levels. In addition to premising device operation on overall room ozone concentration, the controller may take into account average ozone concentration over time so as to maintain overall average room ozone concentration levels below some threshold but allowing short-term higher concentration levels to exist for some short period of time. This feature permits average ozone exposure levels to which room occupants may be exposed to be maintained at some safe level while allowing short-term spikes in ozone concentration levels to be detected without implementing immediate corrective actions to reduce power and concomitant ozone production. This average may include values for some predetermined or variable period of time in the past, i.e., a moving or running average or mean. In addition or alternative to computation of a moving average, other statistical techniques known in the art may be used to provide ozone concentration level trend information including the use of additional information detected, calculated, derived from past device operation/history and/or given about the environment (e.g., room size, ventilation exchange rates, etc.)

Referring to FIG. 17, as before calibration is performed upon initial application of power to determine the threshold value for ozone after which maximum power is applied. After some period of time after ozone concentration level stabilization around minute thirty, some condition changes (e.g. a door closes) causing the ozone concentration level and therefore the ozone sensor reading to increase during the period from minute 30 through minute 40. In response, at minute 39, EFA unit speed is reduced so that the speed is turned down together with resultant ozone production. The ozone concentration level is then shown to level off around minute 40 below the unsafe threshold level, i.e., at a safe level. In response, EFA unit power or speed is increased back to that originally set by the user around minute 46. Since, as shown, the ozone concentration level does not exceed the threshold unsafe level, the unit continues to operate at this high speed.

After some additional time, starting around minute 52 and continuing through minute 54, there is small spike in the sensed ozone concentration level that that immediately goes disappears such that it is ignored as an anomaly assuming it unlikely that ozone would have risen and dropped so fast. Therefore, the EFA unit continues to be operated at high speed. After some additional time, another spike in sensed ozone concentration is detected beginning at minute 60, gradually increasing so that it exceeds the safe threshold level around minute 62. However, this time, the sensed ozone concentration level remains high for some extended period of time shown as about 1 minute after stabilization. In response, EFA unit operating speed is reduced resulting in a corresponding immediate reduction in sensed ozone concentration level. However, because the sensed ozone level stabilizes below but close to the maximum safe threshold level, the operating power/speed of the unit is maintained at the level shown and no further attempts are made to increase operating speed. That is, since the ozone is very close to the unsafe level, the unit does not try to raise speed with a resultant increase in ozone concentration level beyond a safe limit, the EFA unit continuing to be operated at this "medium" or intermediate power level or speed.

In this disclosure, there is shown and described only the preferred embodiment of the invention, but it is to be understood that the invention is capable of use in various other combinations and environments and is capable of changes or modifications within the scope of the inventive concept as expressed herein. For example, while particular embodiments are described herein for heating air to promote ozone conversion to diatomic oxygen, other methods and implementations for thermally exciting the fluid flow are possible. Further, while the examples presented include ozone as a constituent component of air subject to monitoring and control, other components of a generalized fluid may be subject to monitoring and control.

It should also be noted and understood that all publications, patents and patent applications mentioned in this specification are indicative of the level of skill in the art to which the invention pertains. All publications, patents and patent applications are herein incorporated by reference to the same extent as if each individual publication, patent or patent application was specifically and individually indicated to be incorporated by reference in its entirety.

What is claimed:

1. A method of accelerating a fluid comprising of:
applying a high voltage to an array of electrodes to create a corona discharge;
monitoring a constituent component of the fluid as present in an output fluid flow from said array of electrodes; and
supplying a heating current to raise a temperature of the fluid in response to a level of said constituent component.

2. The method according to claim 1 wherein said step of monitoring includes measuring a level of ozone present in a fluid flow generated at an exhaust of said array of electrodes and said step of supply said heating current is responsive to said level of said ozone.

3. The method according to claim 1 wherein said step of supplying includes supplying a corona heating current to an array of corona discharge electrodes.

4. The method according to claim 3 wherein said step of supplying a corona heating current includes sequentially supplying said corona hearing current to respective portions of said corona discharge electrodes.

5. The method according to claim 3 wherein said step of supplying a corona heating current includes periodically increasing a level of said corona heating current over a lifetime of said array of electrodes.

6. The method according to claim 3 wherein said step of supplying a corona heating current includes ramping up and ramping down a level of said corona heating current over a heating period.

7. The method according to claim 1 further comprising a step of vibrating one of said array of electrodes.

8. The method according to claim 7 wherein said step of vibrating includes supplying a voltage to an array of corona discharge electrodes to thereby create an electric field inducing said electrodes to vibrate.

9. The method according to claim 1 further comprising a step of gradually reducing a high voltage supplied to said array of while gradually applying said heating current to said array of electrodes.

10. The method according to claim 1 further comprising a step of applying a mechanical tension to ones of said array of electrodes so as to reduce sagging of said electrodes caused by thermal expansion.

11. The method according to claim 1 further comprising a step of reorienting an array of corona wires so as to render a previously operational portion of said corona wires nonfunctional and to render operational opposing portions of said corona wires.

12. The method according to claim 1 wherein said step of monitoring includes (i) identifying a concentration level of said constituent component of the fluid and (ii) identifying a room operating environment, and said step of supplying a heating current includes operating said array of electrodes in manner so as to maintain an ambient level of said constituent component of the fluid below a predetermined threshold value.

13. The method according to claim 1 wherein said step of monitoring includes identifying a trend in a concentration level of said constituent component of the fluid present in a room and said step of supplying a heating current includes operating said arry of electrodes so as to maintain said concentration level of said constituent component of the fluid present in a room below a predetermined threshold value.

14. The method according to claim 1 further comprising a step of distinguishing between (i) a transitory concentration value indicative of temporary, local concentration level of said constituent components and (ii) a trend-indicative ambient concentration value indicative of an overall room concentration level of said constituent component and wherein said step of supplying includes operating said array of electrodes to maintain an overall room concentration level of said constituent component of the fluid present in a room below a predetermined threshold value.

15. The method according to claim 14 wherein said step of operating said array of electrodes to maintain said overall room concentration level of said constituent component of the fluid present in a room below a predetermined threshold value includes gradually adjusting a magnitude of said heating current.

16. The method according to claim 1 further comprising a step of calculating a running average concentration of said constituent component of the fluid and, in response, operating said array of electrodes so as to maintain said a concentration level of said constituent component of the fluid present in a room below a predetermined threshold value.

* * * * *

UNITED STATES PATENT AND TRADEMARK OFFICE
CERTIFICATE OF CORRECTION

PATENT NO. : 7,410,532 B2
APPLICATION NO. : 11/347565
DATED : August 12, 2008
INVENTOR(S) : Igor A. Krichtafovitch et al.

It is certified that error appears in the above-identified patent and that said Letters Patent is hereby corrected as shown below:

In column 1, after "as follows:" in paragraph 1, line 11 of the Cross-Reference to Related Applications, please restore the following text from the application as originally filed:

U.S. Patent Application Serial No. 09/419,720 filed October 14, 1999 (now U.S. Patent No. 6,504,308 issued January 7, 2003) entitled "Electrostatic Fluid Accelerator";

U.S. Patent Application Serial No. 10/175,947 filed June 21, 2002 (now U.S. Patent No. 6,664,741 issued December 16, 2003) entitled "Method of and Apparatus for Electrostatic Fluid Acceleration Control of a Fluid Flow";

U.S. Patent Application Serial No. 10/187,983 filed July 3, 2002 (Pub. No. US 2004/0004797) entitled "Spark Management Method and Device";

U.S. Patent Application Serial No. 10/188,069 filed July 3, 2002 (now U.S. Patent No. 6,727,657 issued April 27, 2004) entitled "Electrostatic Fluid Accelerator for and a Method of Controlling Fluid Flow";

U.S. Patent Application Serial No. 10/295,869 filed November 18, 2002 (Pub. No. US 2003/0090209) entitled "Electrostatic Fluid Accelerator";

U.S. Patent Application Serial No. 10/352,193 filed January 28, 2003 (Pub. No. US 2004/0155612) entitled "Electrostatic Fluid Accelerator for and Method of Controlling a Fluid Flow";

U.S. Patent Application Serial No. 10/724,707 filed December 2, 2003 entitled "Corona Discharge Electrode and Method of Operating the Same";

U.S. Patent Application Serial No. 10/735,302 filed December 15, 2003 (Pub. No. US 2004/0183454) entitled "Method of and Apparatus for Electrostatic Fluid Acceleration Control of a Fluid Flow";

Signed and Sealed this

Fifteenth Day of June, 2010

David J. Kappos
*Director of the United States Patent and Trademark Office*

CONTINUED

U.S. Patent Application Serial No. 10/752,530 filed January 8, 2004 entitled "Electrostatic Air Cleaning Device";

U.S. Patent Application Serial No. 10/806,473 filed March 23, 2004 (Pub. No. US 200410217720) entitled "Electrostatic Fluid Accelerator for and a Method of Controlling Fluid Flow"; and U.S. Patent Application Serial No. 10/847,438 filed May 18, 2004 (Pub. No. US 2004/0212329) entitled "Electrostatic Fluid Accelerator for and a Method of Controlling Fluid Flow";

In column 2, line 17, please replace "sensor" with --sensors--;
    line 38, please delete "is";
    line 40-41, please replace "significant" with --significantly--;
    line 42, please replace "that" with --than--;
    line 63, please replace "though" with --through--.

In column 6, line 26, please replace "$18.9 \times 10^-{}_6/C.$" with --$18.9 \times 10^{-6}/C$--;
    line 38, please add --of-- after "hundreds";

In column 8, line 6, please replace "elongates" with --elongate--;
    line 60, please replace "C." with --C,--;

In column 9, line 4, please add --in-- after "destroyed";
    line 13, please replace "C." with --C,--;
    line 46, please delete "the";

In column 10, line 44, please add --a-- after "is";
    line 54, please delete "an";

In column 11, line 12, please add --be-- after "should";
    line 52, please replace "though" with --through--;
    line 63, please replace "though" with --through--;

In column 12, line 51, please replace "C." with --C--;

In column 13, line 2, please replace "ease" with --case--;
    line 10, please replace "1102. inactive" with --1102, inactive--;

In column 14, line 3, please delete the first occurrence of "be";
    line 17, please replace "eases" with --cases--;
    line 29, please insert --that-- after "determined";
    line 35, please delete "a";
    line 52, please replace "occupies" with --occupy--;

CERTIFICATE OF CORRECTION (continued)
U.S. Pat. No. 7,410,532 B2

CONTINUED

In column 15, line 12, please replace "electrodes" with --electrode--;
        line 18, please add --the-- after "substantially";
        line 42, please replace "a" with --an--;

In column 16, line 3, please replace "my" with --may--;
        line 16, please add --that-- after "such";
        line 26, please replace "depicts" with --depicted--;
        line 35, please add --to-- after "reduced";
        line 38, please add --a-- after "is";

In column 17, line 51, please remove the second occurrence of "that" and remove "goes";
        line 52, please insert --is-- after "it";

In column 18, claim 9, line 66, please insert --electrodes-- after "of";

In column 19, claim 12, line 14, please insert --a-- after "in";

In column 19, claim 13, line 22, please replace "any" with --array--;

In column 20, claim 16, line 20, please replace "said a" with --a--.

UNITED STATES PATENT AND TRADEMARK OFFICE
CERTIFICATE OF CORRECTION

PATENT NO. : 7,410,532 B2
APPLICATION NO. : 11/347565
DATED : August 12, 2008
INVENTOR(S) : Igor A. Krichtafovitch et al.

It is certified that error appears in the above-identified patent and that said Letters Patent is hereby corrected as shown below:

In column 1, after "as follows:" in paragraph 1, line 11 of the Cross-Reference to Related Applications, please restore the following text from the application as originally filed:

U.S. Patent Application Serial No. 09/419,720 filed October 14, 1999 (now U.S. Patent No. 6,504,308 issued January 7, 2003) entitled "Electrostatic Fluid Accelerator";

U.S. Patent Application Serial No. 10/175,947 filed June 21, 2002 (now U.S. Patent No. 6,664,741 issued December 16, 2003) entitled "Method of and Apparatus for Electrostatic Fluid Acceleration Control of a Fluid Flow";

U.S. Patent Application Serial No. 10/187,983 filed July 3, 2002 (Pub. No. US 2004/0004797) entitled "Spark Management Method and Device";

U.S. Patent Application Serial No. 10/188,069 filed July 3, 2002 (now U.S. Patent No. 6,727,657 issued April 27, 2004) entitled "Electrostatic Fluid Accelerator for and a Method of Controlling Fluid Flow";

U.S. Patent Application Serial No. 10/295,869 filed November 18, 2002 (Pub. No. US 2003/0090209) entitled "Electrostatic Fluid Accelerator";

U.S. Patent Application Serial No. 10/352,193 filed January 28, 2003 (Pub. No. US 2004/0155612) entitled "Electrostatic Fluid Accelerator for and Method of Controlling a Fluid Flow";

U.S. Patent Application Serial No. 10/724,707 filed December 2, 2003 entitled "Corona Discharge Electrode and Method of Operating the Same";

U.S. Patent Application Serial No. 10/735,302 filed December 15, 2003 (Pub. No. US 2004/0183454) entitled "Method of and Apparatus for Electrostatic Fluid Acceleration Control of a Fluid Flow";

This certificate supersedes the Certificate of Correction issued June 15, 2010.

Signed and Sealed this

Fourteenth Day of September, 2010

David J. Kappos
*Director of the United States Patent and Trademark Office*

CERTIFICATE OF CORRECTION (continued)
U.S. Pat. No. 7,410,532 B2

U.S. Patent Application Serial No. 10/752,530 filed January 8, 2004 entitled "Electrostatic Air Cleaning Device";

U.S. Patent Application Serial No. 10/806,473 filed March 23, 2004 (Pub. No. US 200410217720) entitled "Electrostatic Fluid Accelerator for and a Method of Controlling Fluid Flow"; and U.S. Patent Application Serial No. 10/847,438 filed May 18, 2004 (Pub. No. US 2004/0212329) entitled "Electrostatic Fluid Accelerator for and a Method of Controlling Fluid Flow";

In column 2, line 17, please replace "sensor" with --sensors--;
line 38, please delete "is";
line 40-41, please replace "significant" with --significantly--;
line 42, please replace "that" with --than--;
line 63, please replace "though" with --through--.

In column 6, line 26, please replace "$18.9 \times 10^-{}_6/C.$" with --$18.9 \times 10^{-6}/C$--;
line 38, please add --of-- after "hundreds";

In column 8, line 6, please replace "elongates" with --elongate--;
line 60, please replace "C." with --C,--;

In column 9, line 4, please add --in-- after "destroyed";
line 13, please replace "C." with --C,--;
line 46, please delete "the";

In column 10, line 44, please add --a-- after "is";
line 54, please delete "an";

In column 11, line 12, please add --be-- after "should";
line 52, please replace "though" with --through--;
line 63, please replace "though" with --through--;

In column 12, line 51, please replace "C." with --C--;

In column 13, line 2, please replace "ease" with --case--;
line 10, please replace "1102. inactive" with --1102, inactive--;

In column 14, line 3, please delete the first occurrence of "be";
line 17, please replace "eases" with --cases--;
line 29, please insert --that-- after "determined";
line 35, please delete "a";
line 52, please replace "occupies" with --occupy--;

CERTIFICATE OF CORRECTION (continued)
U.S. Pat. No. 7,410,532 B2

In column 15, line 12, please replace "electrodes" with --electrode--;
        line 18, please add --the-- after "substantially";
        line 42, please replace "a" with --an--;

In column 16, line 3, please replace "my" with --may--;
        line 16, please add --that-- after "such";
        line 26, please replace "depicts" with --depicted--;
        line 35, please add --to-- after "reduced";
        line 38, please add --a-- after "is";

In column 17, line 51, please remove the second occurrence of "that" and remove "goes";
        line 52, please insert --is-- after "it";

In column 18, claim 9, line 66, please insert --electrodes-- after "of";

In column 19, claim 12, line 14, please insert --a-- after "in";

In column 19, claim 13, line 22, please replace "arry" with --array--;

In column 20, claim 16, line 20, please replace "said a" with --a--.